United States Patent [19]
Tanaka et al.

[11] Patent Number: 5,815,485
[45] Date of Patent: Sep. 29, 1998

[54] RECORDING MEDIUM, A METHOD FOR PRODUCING THE SAME, A CONTROL METHOD USING THE RECORDING MEDIUM, AND A RECORDING/ REPRODUCING APPARATUS USING THE RECORDING MEDIUM

[75] Inventors: Shinichi Tanaka, Kyoto; Hiromichi Ishibashi, Ibaraki; Mitsurou Moriya, Ikoma; Shinichi Kadowaki, Hirakata, all of Japan

[73] Assignee: Matsushita Electric Industrial Co., Ltd., Kadoma, Japan

[21] Appl. No.: 703,859

[22] Filed: Aug. 27, 1996

Related U.S. Application Data

[63] Continuation of Ser. No. 189,685, Feb. 1, 1994, abandoned.

[30] Foreign Application Priority Data

Feb. 2, 1993 [JP] Japan .................................. 5-015198
Mar. 10, 1993 [JP] Japan .................................. 5-048916

[51] Int. Cl.$^6$ ............................................. G11B 7/00
[52] U.S. Cl. .................................. 369/275.3; 369/44.26
[58] Field of Search .............................. 369/275.3, 275.4, 369/44.26, 44.34, 44.13, 44.28; 360/48

[56] References Cited

U.S. PATENT DOCUMENTS

| | | | |
|---|---|---|---|
| 4,057,833 | 11/1977 | Braat | 358/128 |
| 4,491,940 | 1/1985 | Tinet | 364/46 |
| 4,583,209 | 4/1986 | Bierhoff | 369/46 |
| 5,012,460 | 4/1991 | Popovich et al. | 369/32 |
| 5,099,467 | 3/1992 | Sumihiro et al. | 369/275.3 X |
| 5,270,991 | 12/1993 | Verboom | 369/44.26 |
| 5,295,127 | 3/1994 | Verboom et al. | 369/275.3 X |
| 5,295,131 | 3/1994 | Ishibashi et al. | 369/275.3 |
| 5,321,675 | 6/1994 | Ito et al. | 369/44.26 X |
| 5,406,545 | 4/1995 | Kadowaki | 369/44.26 |

FOREIGN PATENT DOCUMENTS 346126 2/1991 Japan .

*Primary Examiner*—Thang V. Tran
*Attorney, Agent, or Firm*—Renner, Otto, Boisselle & Sklar, P.L.L.

[57] ABSTRACT

A disk-shaped recording medium includes a plurality of first tracks and a plurality of second tracks for recording data, the first track and the second track being alternately arranged in the radial direction on the surface of the recording medium in one of a pattern of concentric circles and a spiral pattern; a plurality of first servo areas and a plurality of second servo areas discretely located at a plurality of respective specified rotation angular positions of the surface along the circumferential direction of the recording medium; and a plurality of first servo marks and a plurality of second servo marks used for tracking control. The first servo marks are provided in the first servo areas along each of the first tracks, and the servo marks are provided in the second servo areas along each of the second tracks.

10 Claims, 12 Drawing Sheets

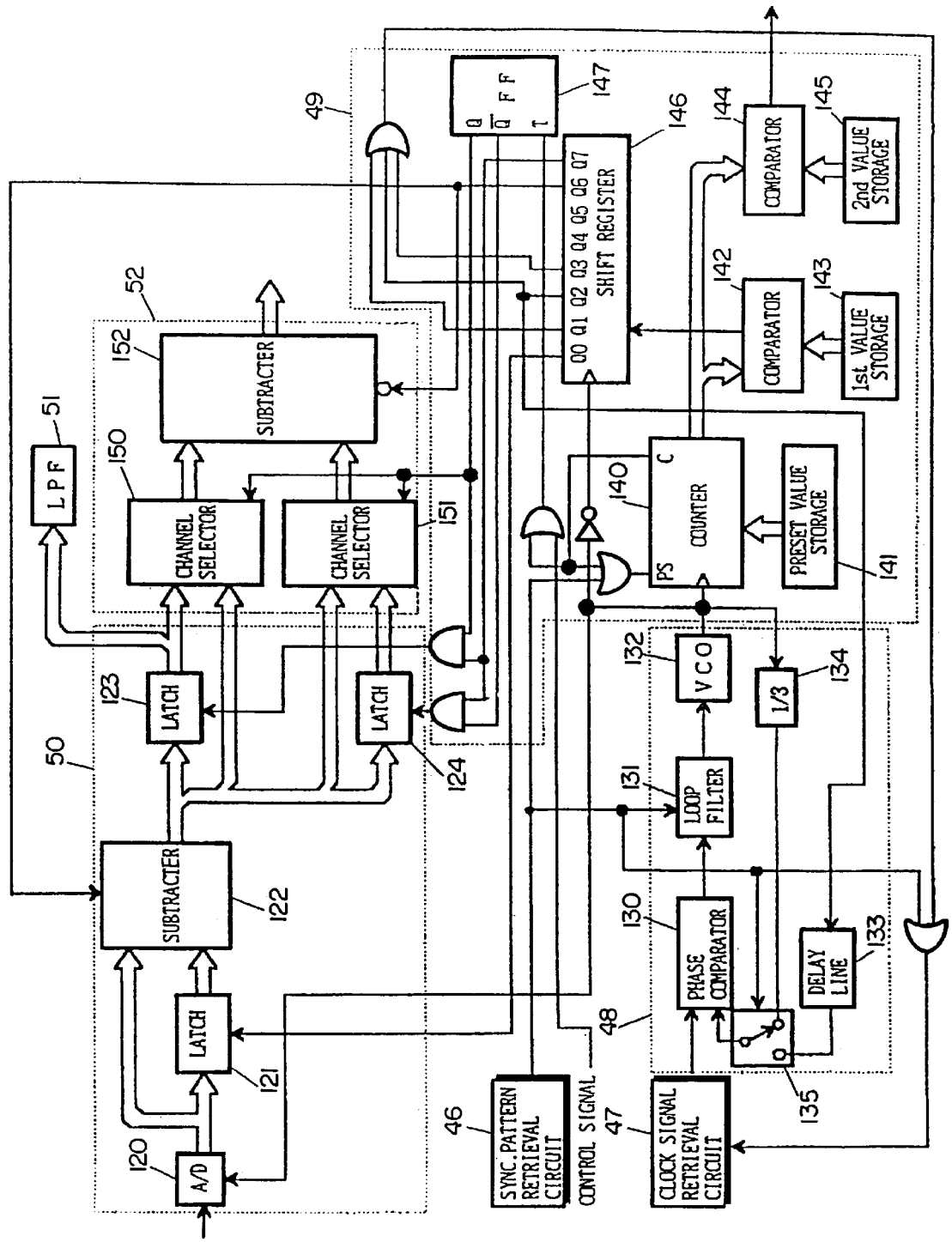

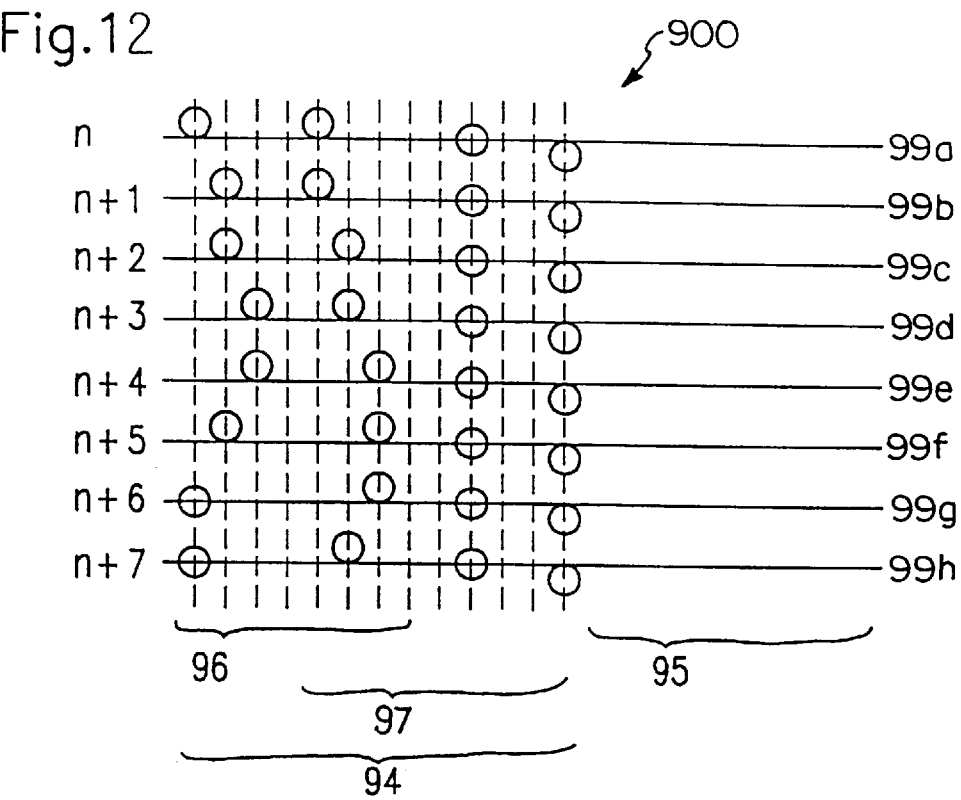

RECORDING MEDIUM, A METHOD FOR PRODUCING THE SAME, A CONTROL METHOD USING THE RECORDING MEDIUM, AND A RECORDING/ REPRODUCING APPARATUS USING THE RECORDING MEDIUM

This application is a continuation of application Ser. No. 08/189,685 filed on Feb. 1, 1994, now abandoned.

BACKGROUND OF THE INVENTION

1. Field of the Invention:

The present invention relates to a recording medium and a method for producing the same, a control method using the recording medium, and a recording/reproducing apparatus using the recording medium. In particular, the present invention relates to a recording medium having servo marks for performing dynamic tracking on a track storing data and a method for producing the same, a recording medium having an access code for allowing access to a target track and a method for producing the same, a method for controlling the same, and a recording/reproducing apparatus for controlling the recording and reproduction using such a recording medium.

2. Description of the Related Art:

Recently, recording densities of recording/reproducing apparatuses has been remarkably developed. Especially, in the field of recording/reproducing apparatuses using a disk-shaped recording medium such as magnetic disks and optical disks, studies have been made to reduce the track pitch in order to improve the recording density. Several proposals have been made to perform stable tracking and accurate access to a target track even on a recording medium having a small track pitch.

For example, the U.S. Pat. No. 5,012,460 discloses a technology to perform stable tracking even on an optical disk having a small track pitch. Referring to FIG. 11, such technology referred to as the "sample servo system" will be described. As shown in FIG. 11, a recording medium 800 includes a plurality of servo areas 90 used for tracking the servo control are arranged discretely along each of a plurality of tracks 98 of the recording medium 800. Two adjacent servo areas 90 interpose a data area 91.

In each servo area 90, there are wobbled marks displaced inward from the center of the track and a wobbled marks displaced outward from the center of the track along each track. For example, a wobbled mark 92a is displaced inward from the track 98a and a wobbled mark 93a is displaced outward from the center of the track 98a in each servo area 90. In a similar manner, wobbled marks 92b and 93b are displaced outward and inward from the center of the track 98b in each servo area 90. Wobbled marks 92c and 93c are displaced inward and outward from the center of the track 98c in each servo area 90. Wobbled marks 92d and 93d are displaced outward and inward from the center of the track 98d in each servo area 90. The wobbled mark displaced inward from the center of the track (for example, the wobbled mark 92a) is displaced at the same distance from the center of the track as that of the wobbled mark displaced outward from the center of the track (for example, the wobbled marks 93a), in each servo area 90. The wobbled marks 92a and 93a are arranged with a predetermined distance from each other along the track. Two corresponding wobbled marks along the adjacent track are displaced from the center of the tracks in the opposite directions from each other. And order of displacement of the pair of wobbled marks is different from that of a pair of wobbled marks on adjacent tracks. For example, the wobbled mark 92b of the track 98b is displaced outward from the center of the track 98b and the wobbled mark 93b is displaced inward from the center of the track 98b. While the wobbled mark 92c of the track 98c is displaced inward from the center of the track 98c and the wobbled marks 93c of the track 98c is displaced outward from the center of the track 98c. Accordingly, there are two wobbled marks 92 or 93 arranged in the radial direction between each two adjacent tracks.

In the recording medium having the above-described structure, the tracking control is performed in the following manner.

Each two wobbled marks 92 and 93 are displaced from the center of the track by an equal distance in the opposite direction from each other. While a beam spot is tracking the center of the track, the degree of modulation of the intensity of light reflected by the recording medium 800 is the same irrespective of which wobble mark the light is reflected. (Hereinafter, the degree of modulation will be referred to as the "level of the detection signal".) While the beam spot is tracking a position deviated from the center of the track, 98b for example, the detection signal's detected when the beam spot passes, the wobbled mark 92b and the detection signals detected when the beam spot passes the next wobbled mark 93b have different levels from each other. By such a difference in the level of the detection signals, a tracking error is detected. Based on the tracking error detected in this manner (represented by a tracking error signal), the tracking error is corrected so that the beam spot can track the center of the track.

As is mentioned above, the wobbled marks disposed between two adjacent tracks are displaced in the opposite directions from each other. Due to such an arrangement, even in the case that the distance between two adjacent tracks is small, the two wobbled marks located between the two adjacent tracks act as one wobbled mark. In other words, the crosstalk from the two wobbled marks displaced from such two adjacent tracks do not prevent the detection of the tracking error, but rather is advantageous to the detection of the tracking error. In the radial direction of the recording medium 800 crossing the tracks 98a through 98d, every other wobbled mark (for example, the wobbled mark 92a and 92c) are displaced inward from the center of the track, and every other wobbled marks (for example, the wobbled marks 92b and 92d) are displaced outward from the center of the track. Due to such an arrangement, the cycle of the tracking error signal detected while a read/write head moves in the radial direction of the recording medium 800 corresponds to two tracks of the recording medium 800. Accordingly, the dynamic range for detecting the tracking error is equal to the dynamic range obtained when the recording medium 800 has a track pitch twice as wide as the track pitch shown in FIG. 11. As a result, the tracking control can be more stable.

The above-described structure, however, has the following problem. In the case where the tracks are formed with non-uniform track pitches by fluctuations in the moving pitch of the beam spot, the amount of the crosstalk from one of two adjacent tracks is different from that from the other of the two adjacent tracks even when the read/write head is tracking on the center of the track between the two adjacent tracks. Accordingly, such a variation in the track pitch causes an offset of the tracking error signal. Such an inconvenience prevents accurate detection of tracking errors.

Japanese Laid-Open Patent Publication No. 3-46126 discloses a method for accessing a target track in an optical disk having servo areas arranged discretely along each of a plurality of tracks. Referring to FIG. 12, such a method will be described.

As is shown in FIG. 12, each track of an optical disk 900 has a plurality of servo areas 94 discretely displaced at predetermined angular positions so that they are arranged in the radial direction (only one of them shown in FIG. 12). Each servo area 94 has an access code area 96. In the access code area 96, eight different types of access codes are recorded respectively on eight tracks 99a through 99h. In other words, one cycle of access codes corresponds to eight tracks 99a through 99h. A tracking area 97 used for tracking control is partially overlapped with the access code area 96.

In the optical disk 900 having the above-mentioned structure, the access control is performed in the following manner.

An access code is detected when a read/write head of a recording/reproducing apparatus crosses the track in the access code. The number of the tracks which have been crossed by the read/wright head during two sampling times is detected from the access codes. Based on the difference of the crosstalk detected at the two sampling times. Based on such a number of tracks, between the two sampling times, the velocity of the read/write head is detected. By cumulating the number of the tracks, the position of the read/write head is detected. Utilizing such a system, the read/write head can be moved to the target track by the controlled velocity of the read/write head.

The above-described method has the following problem. In the case that the read/write head moves at such a velocity as to cross a half or more of the tracks corresponding to one cycle of the access codes (eight tracks in the optical disk 900 in FIG. 12) in the period between the two sampling times, the read/write head is mistakenly recognized as to move in the opposite direction.

In other words, in the case when one cycle of the access codes is short, the maximum velocity of the read/write head is restricted to be low, and thus the access time cannot be desirably shortened. If one cycle of the access codes is extended, the number of bits is raised and thus the redundancy is increased.

SUMMARY OF THE INVENTION

A disk-shaped recording medium according to the present invention includes a plurality of first tracks and a plurality of second tracks for recording data, the first tracks and the second tracks being alternately arranged in a radial direction on a surface of the recording medium in one of a pattern of concentric circles and a spiral pattern; a plurality of first servo areas and a plurality of second servo areas discretely located at a plurality of respective specified rotation angular positions of the surface along the circumferential direction of the recording medium; and a plurality of first servo marks and a plurality of second servo marks used for tracking control. The first servo marks are provided in the first servo areas along each of the first tracks, and the second servo marks are provided in the second servo areas along each of the second tracks.

In one embodiment of the present invention, the recording medium also includes synchronization marks respectively provided at a plurality of specified angular positions along each of the first and the second tracks excluding the first and the second servo areas, the synchronization marks having a specified pattern which is different from any pattern of data in the recording medium. The recording medium also includes mark rows respectively provided next to the synchronization marks along each of the first and the second tracks at a specified angular interval. This angular interval is shorter than the rotation angular interval of the clock marks, and also has a relationship indicated by a ratio of integers with the rotation angular interval of the clock marks.

Alternatively, a disk-shaped recording medium according to the present invention includes a plurality of tracks for recording data, the plurality of tracks being arranged in a radial direction on a surface of the recording medium in one of a pattern of concentric circles and a spiral pattern; a plurality of first servo areas and a plurality of second servo areas discretely located at a plurality of specified rotation angular positions of the surface along the circumferential direction of the recording medium; and a first access code and a second access code recorded along each of the plurality of tracks. The first access codes are provided in the first servo area and repeated in the radial direction of the recording medium in the first cycle, each first cycle including a specified first number of tracks, and the second access codes are provided in the second servo area and repeated in the radial direction of the recording medium in a second cycle, each second cycle including a specified second number of tracks, which is different from the specified first number of tracks.

In another aspect of the invention, a method for manufacturing a disk-shaped recording medium includes step (a) of rotating an original disk at a predetermined angular velocity synchronized with a clock signal; step (b) of moving a recording head for recording data in the radial direction by a predetermined distance per rotation of the original disk; step (c) of forming a plurality of first control marks for tracking control at a plurality of specified first rotation angular positions along the first track simultaneously with the formation of the corresponding first track; and step (d) of forming a plurality of second control marks for tracking control at a plurality of specified second rotation angular positions along the second track, different from the specified first angular positions, simultaneously with formation of corresponding second track.

In still another aspect of the invention, an apparatus for performing data recording on and data reproduction from a disk-shaped recording medium, the recording medium including a plurality of first tracks and a plurality of second tracks for recording data, the first track and the second tracks being alternately arranged in a radial direction on the surface of the recording medium in one of a pattern of concentric circles and a spiral pattern; and a plurality of first servo areas and a plurality of second servo areas discretely located at a plurality of respective specified rotation angular positions of the surface along a circumferential direction of the recording medium, the first and the second servo areas including servo marks used for tracking control recorded therein, includes a head for recording data in the recording medium and taking out a first detection signal and a second detection signal from the data recorded in the recording medium, the first detection signal being taken out from the servo marks recorded in the first and the second servo areas while the head is scanning the first and the second tracks respectively, and the second detection signal being taken out from the servo marks recorded in the second and the first servo areas while the head is scanning the first and the second tracks respectively; a tracking error detection circuit for receiving the first and the second detection signals from the head, generating a first tracking error signal for recording based on the first detection signal, and generating a second tracking error signal for recording based on the first and the second detection signals; and a tracking control circuit for receiving the first and the second tracking error signals and controlling the position of the head based on the first and the second tracking error signals.

In still another aspect of the invention, an apparatus for performing data recording on and data reproduction from a disk-shaped recording medium, the recording medium including a plurality of first tracks and a plurality of second tracks for recording data, the first tracks and the second tracks being alternately arranged in a radial direction on the surface of the recording medium in one of a pattern of concentric circles and a spiral pattern, and a plurality of first servo areas and a plurality of second servo areas discretely located at a plurality of respective specified rotation angular positions of the surface along the circumferential direction of the recording medium, the first and the second servo areas including servo marks used for tracking control recorded therein, includes a head for recording data in the recording medium and taking out a first detection signal and a second detection signal from the data recorded in the recording medium, the first detection signal being taken out from the servo marks recorded in the first and the second servo areas while the head is scanning the first and the second tracks respectively, and the second detection signal being taken out from the servo marks recorded in the second and the first servo areas while the head is scanning the first and the second tracks respectively; a tracking error detection circuit for receiving the first and the second detection signals from the head, generating a first tracking error signal for reproduction based on the second detection signal, and generating a second tracking error signal for reproduction based on the first and the second detection signals; and a tracking control circuit for receiving the first and the second tracking error detection signals and controlling the position of the head based on the first and the second tracking error detection signals.

In still another aspect of the invention, an apparatus for performing data recording on and data reproduction from a disk-shaped recording medium, the recording medium including a plurality of tracks for recording data arranged along a radial direction on the surface of the recording medium in one of a pattern of concentric circles and a spiral pattern; a plurality of first servo areas and a plurality of second servo areas discretely located at a plurality of respective specified rotation angular positions of the surface along the circumferential direction of the recording medium; a first access code recorded in the first servo area and repeated in the radial direction of the recording medium in a first cycle, each including a specified number of tracks; and a second access code recorded in the second serve area and repeated in the radial direction of the recording medium in a second cycle, each including another specified number of tracks, includes a head for recording data in the recording medium and taking out a signal from the data recorded in the recording medium; an access code reading circuit for receiving the signal from the head and reading the first and the second access codes from the signal at a specified timing; a track address estimating circuit for estimating the moving velocity and the current position of the head based on the first and the second access codes read by the access code reading circuit; and a access control circuit for moving the head to a given target track based on the moving velocity and the current position of the head estimated by the address estimating circuit. When the ratio of change of the second access codes read by the access code reading circuit exceeds a specified level, the track address estimating circuit estimates the moving velocity and the current position of the head based on the ratio of change of the first access codes; and when the ratio of change of the second access codes read by the access code reading circuit is the specified level at the maximum, the track address estimating circuit estimates the moving velocity and the current position of the head based on the ratio of change of the first and the second access codes.

In still another aspect of the invention, an apparatus for performing data recording on and data reproduction from a disk-shaped recording medium, the recording medium including a plurality of first tracks and a plurality of second tracks for recording data, the first track and the second track being alternately arranged in a radial direction on the surface of the recording medium in one of a pattern of concentric circles and a spiral pattern; and a plurality of first servo areas and a plurality of second servo areas discretely located at a plurality of respective specified rotation angular positions of the surface along the circumferential direction of the recording medium; and servo marks recorded along each of the first and the second tracks in each of the first and the second servo areas for tracking control and marks recorded on each of the first and the second tracks, includes a head for recording data in the recording medium and taking out signals from the data recorded in the recording medium; a tracking error detection circuit for receiving, from the head, a detection signal taken out from the servo marks and a signal taken out from the marks and generating a tracking error signal based on the detection signal and a sum signal based on the signal from the marks; and a traverse control circuit for receiving the tracking error signal and the sum signal, detecting a first moving velocity of the head based on the ratio of change in the tracking error signal, detecting a second moving velocity of the head based on a ratio of change in the sum signal, and moving the head in the radial direction of the recording medium based on one of the first and the second moving velocities which ever has a larger absolute value.

A method according to the present invention, for tracking control of a head of a recording/reproduction apparatus using a disk-shaped recording medium, the recording medium including a plurality of first tracks and a plurality of second tracks for recording data, the first track and the second track being alternately arranged in a radial direction on the surface of the recording medium in one of a pattern of concentric circles and a spiral pattern; and a plurality of first servo areas and a plurality of second servo areas discretely located at a plurality of respective specified rotation angular positions of the surface along the circumferential direction of the recording medium, the first and the second servo areas including servo marks used for tracking control recorded therein, includes the steps of: taking out a first detection signal from the servo marks recorded in the first and the second servo areas while the head is tracking the first and the second tracks respectively; taking out a second detection signal from the servo marks recorded in the second and the first servo areas while the head is tracking the first and the second tracks respectively; generating a first tracking error signal for recording based on the first detection signal; generating a second tracking error signal for recording based on the first and the second detection signals; controlling the position of the head based on the first and the second tracking error signals; and recording a predetermined data on the first or the second track being tracked by the head.

In another aspect of the invention, a method for tracking control of a head of a recording/reproduction apparatus using a disk-shaped recording medium, includes the steps of taking out a first detection signal from the servo marks recorded in the first and the second servo areas while the head is tracking the first and the second tracks respectively; taking out a second detection signal from the servo marks recorded in the second and the first servo areas while the head is tracking the first and the second tracks respectively; generating a first tracking error signal for reproduction based on the second detection signal; generating a second tracking error signal for reproduction based on the first and the second detection signals; controlling the position of the head based on the first and the second tracking error signals; and reproducing data from the first or the second track being tricked by the head.

In still another aspect of the invention, a method for access control of a head of a recording/reproduction apparatus using a disk-shaped recording medium, the recording medium including a plurality of tracks for recording data arranged along the radial direction on the surface of the recording medium in one of a pattern of concentric circles and a spiral pattern; a plurality of first servo areas and a plurality of second servo areas discretely located at a plurality of respective specified rotation angular positions of the surface along a circumferential direction of the recording medium; a plurality of first access codes are recorded in the first servo areas, a pattern of the first access codes being periodically repeated in the radial direction of the recording medium with a first period corresponding to a specified number of tracks; and a plurality of second access codes recorded in the second servo areas, a pattern of the second access codes being repeated in the radial direction of the recording medium with a second period, which is less than the first period, corresponding to another specified number of tracks, includes the steps of: reading the first and the second access codes from the data recorded in the recording medium at a specified timing; estimating the moving velocity and the current position of the head based on the first and the second access codes; and moving the head to a given target track based on the moving velocity and the current position of the head. In the step of estimating, the estimation of the moving velocity and the current position of the head is performed based on the ratio of change of the first access codes when the ratio of change of the second access codes exceeds a specified level, and based on the ratio of change of the first and the second access codes when the ratio of change of the second access codes is the specified level at the maximum.

In still another aspect of the invention, a method for controlling a head of a recording/reproduction apparatus using a disk-shaped recording medium, the recording medium including a plurality of first tracks and a plurality of second tracks for recording data, the first track and the second track being alternately arranged in a radial direction on the surface of the recording medium in one of a pattern of concentric circles and a spiral pattern; and a plurality of first servo areas and a plurality of second servo areas discretely located at a plurality of respective specified rotation angular positions of the surface along the circumferential direction of the recording medium; and servo marks recorded along each of the first and the second tracks in each of the first and the second servo areas for tracking control and marks recorded on each of the first and the second tracks, includes the steps of: taking out a detection signal from the servo marks and signals from the marks; generating a tracking error signal based on the detection signal; generating a sum signal based on the signals from the marks; detecting a first moving velocity of the head based on the ratio of change in the tracking error signal; detecting a second moving velocity of the head based on the ratio of change in the sum signal; and moving the head in the radial direction of the recording medium based on the first or the second moving velocity, which ever has a larger absolute value.

Thus, the invention described herein makes possible the advantages of providing (1) a high-density recording medium for realizing accurate and stable tracking control even with a small track pitch and realizing high-speed access control with a low redundancy, a method for producing the same, and a method for performing such tracking control and such access control; and (2) a recording/reproducing apparatus including such a recording medium for performing such tracking control and such access control.

These and other advantages of the present invention will become apparent to those skilled in the art upon reading and understanding the following detailed description with reference to the accompanying figures.

BRIEF DESCRIPTION OF THE DRAWINGS

FIG. 9 is a block diagram illustrating in detail a part of the recording/reproducing apparatus illustrated in FIG. 4.

FIG. 12 is a conceptual view of another conventional recording medium.

DESCRIPTION OF THE PREFERRED EMBODIMENTS

Hereinafter, the present invention will be described by way of illustrative examples with reference to the accompanying drawings.

EXAMPLE 1

Figure 1:
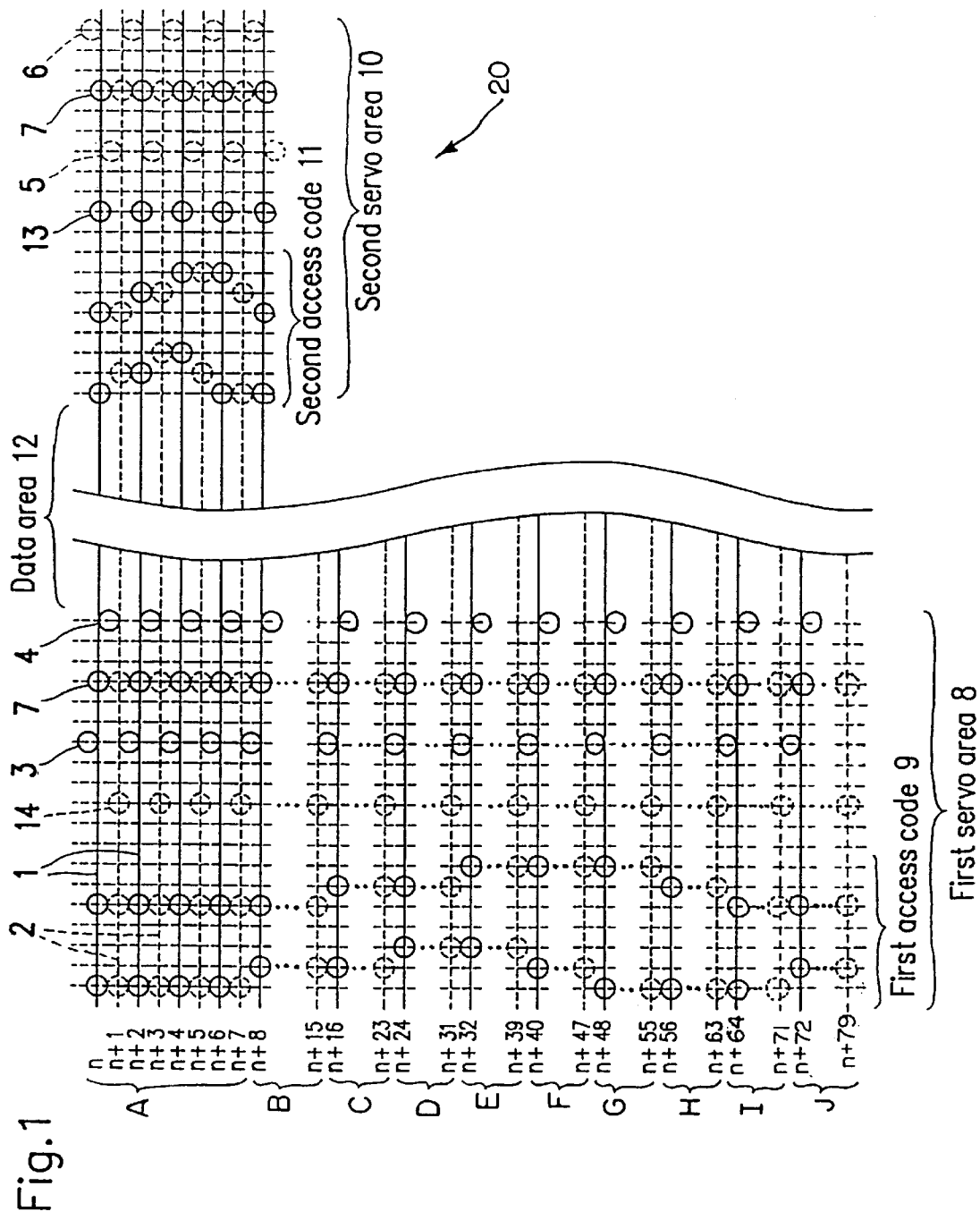
FIG. 1 is a conceptual view of a recording medium in an example according to the present invention.
Figure 2:
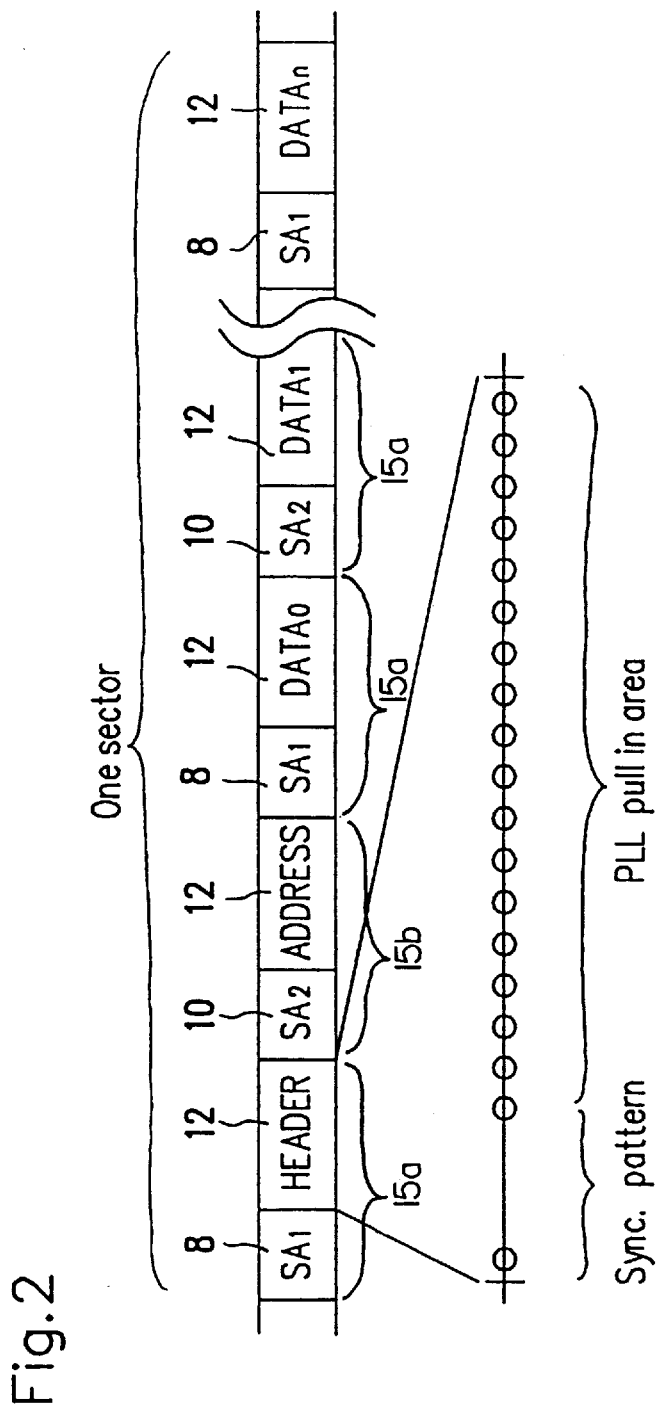
FIG. 2 is a conceptual view of a sector of the recording medium shown in FIG. 1.
Figure 3:
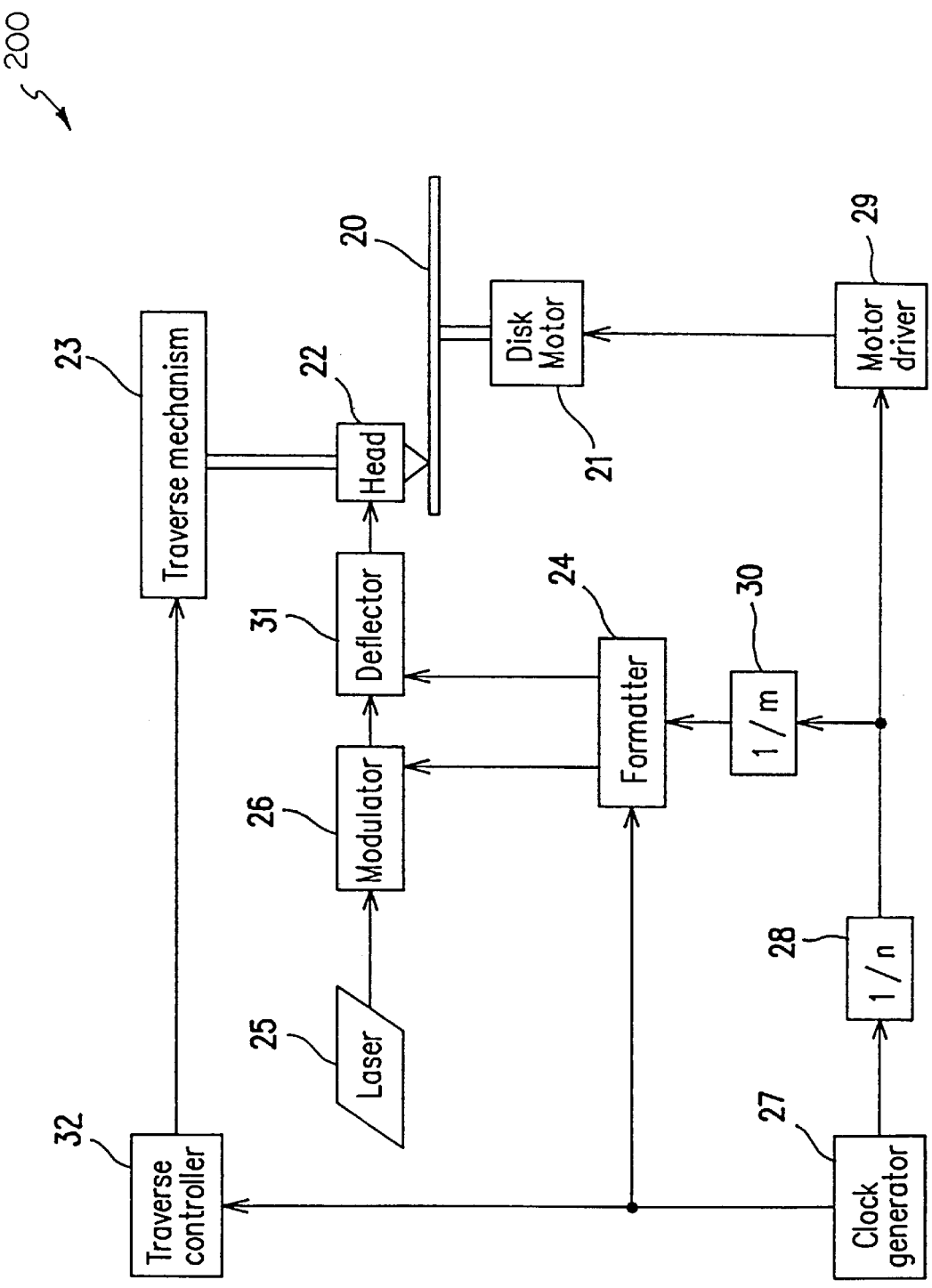
FIG. 3 is a block diagram of an apparatus for manufacturing a recording medium according to the present invention.

Referring to FIGS. 1 through 3, a first example according to the present invention will be described.

Figure 10B:
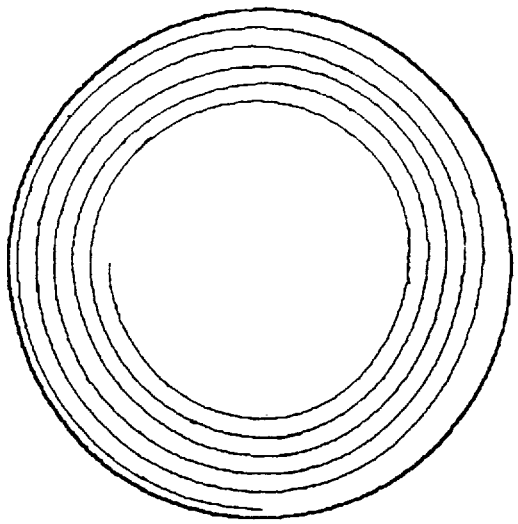
FIGS. 10A and 10B are views of tracks of a recording medium according to the present invention.
Figure 10A:
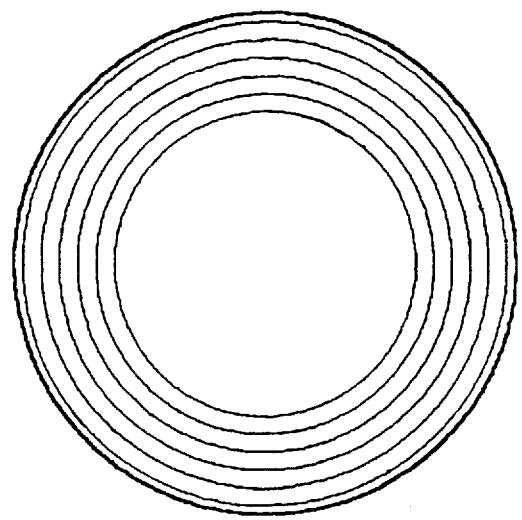
Figure 11:
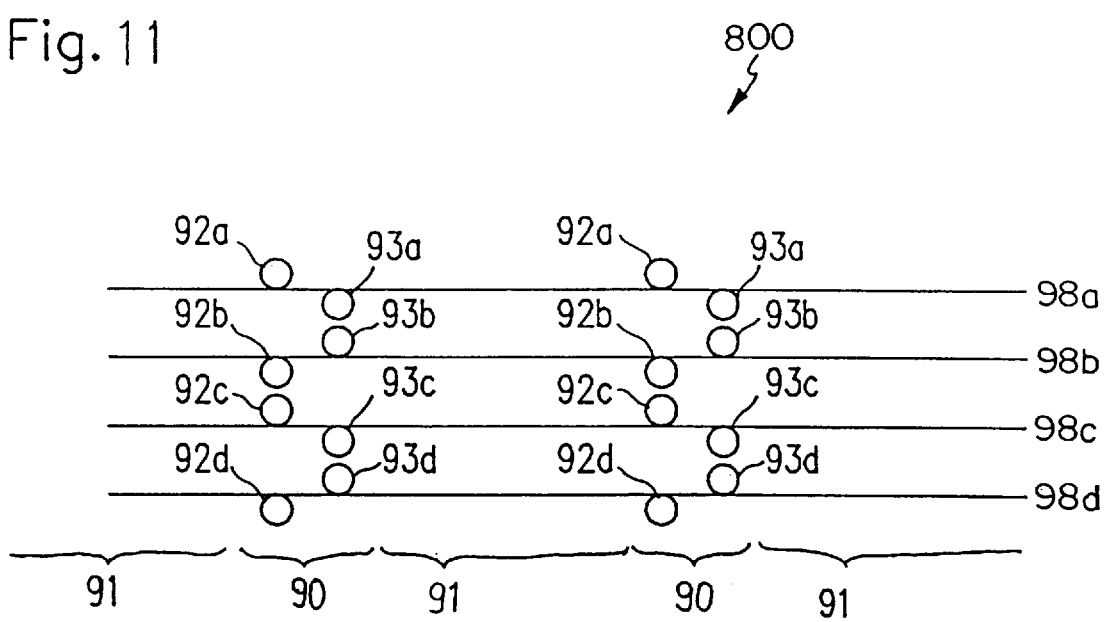
FIG. 11 is a conceptual view of a conventional recording medium.

FIG. 1 is a conceptual view of an optical disk 20 as a recording medium in the first example according to the present invention. The optical disk 20 has a plurality of tracks arranged concentrically with one another or spirally as shown in FIG. 10A and 10B. In FIG. 1, tracks n through n+79 of the optical disk 20 are shown. In FIG. 1, odd number tracks (first tracks) are indicated by reference numeral 1, and even number tracks (second tracks) are indicated by reference numeral 2. The virtual center of each odd number track 1 is indicated by a solid line, and the virtual center of each even number track 2 is indicated by a dashed line. First servo areas 8 and second servo areas 10 (only one for each is shown in FIG. 1) are arranged alternately and discretely at a specified angular position along the circumference direction of the optical disk. A data area 12 is between each first servo area 8 and each second servo area 10. A segment 15 (FIG. 2) includes a first servo area 8, a data area 12, a second servo area 10, and another data area 12 located in a row. The number of the segments 15 necessary for each track is determined based on the angular velocity (rotation frequency) of the optical disk 20 and the crossover frequency of the closed loop for the tracking control. In the first example, there are approximately 1,600 segments 15 in each track.

The first servo area 8 has wobbled marks 3 and 4, a clock mark 7, a first access code 9, and an even flag 14. The second servo area 10 has wobbled marks 5 and 6, a clock mark 7, a second access code 11 and an odd number flag 13. The clock mark 7 and one of the first access code 9 and the second access code 11 are located on each track both in the first servo area 8 and the second servo area 10. The wobbled marks 3 and 4 and the odd flag 13 are located only along each odd number track 1 and the wobbled marks 5 and 6, and the even number flag 14 is located only on each even number track 2. The wobbled marks 3 through 6 each act as a servo mark.

In the first servo area 8, the wobbled marks 3 and 4 in a corresponding wobble are arranged at an interval from each other along the odd number track 1. The wobbled mark 3 is displaced inward a predetermined distance from the center of the odd number track 1, and the wobbled mark 4 is displaced outward by the same predetermined distance from the center of the odd number track 1. The clock mark 7 is disposed between the wobbled marks 3 and 4 along the tracks and on both the odd and the even number tracks 1 and 2.

In the second servo area 10, the wobbled marks 5 and 6 in a corresponding wobble are arranged at the interval from each other along the even number track 2. The wobbled mark 5 is displaced inward by a predetermined distance from the center of the even number track 2, and the wobbled mark 6 is displaced outward by the same predetermined distance from the center of the even number track 2. The clock mark 7 is disposed between the wobbled marks 5 and 6 along the tracks and on both the odd and the even number tracks 1 and 2.

In FIG. 1 in the first example and FIGS. 5, 7 and 8 in the following examples, marks indicated by a solid line are formed simultaneously with the odd number tracks 1, and marks indicated by a dashed line are formed simultaneously with the even number tracks 2. There is no other difference between these marks.

In order to record data in the tracks illustrated in FIG. 1, a sector including a plurality of segments 15a and 15b is recorded as a unit, and each of a plurality of sectors is supplied with an address. Each track includes at least one sector.

FIG. 2 is a conceptual view of a sector. At the start of the data area 12 of the first segment 15 of each sector, a mark of a specific pattern which does not appear in the recorded data is recorded as a synchronization pattern otherwise referred to herein as synchronization marks. Next to the synchronization pattern, a series of marks (also referred to as mark rows) for pulling in a PLL (phase lock loop) for generating a clock is recorded as a PLL pull-in pattern. In the data area 12 of the second segment 15b, the address of the sector is recorded. In the data area 12 of a third or later segments 15a and 15b data for the user is recorded.

A method for recording data into the optical disk 20 having the above-mentioned structure will be described with reference to FIG. 3.

FIG. 3 is a block diagram of a recording/reproducing apparatus 200 for recording data into the optical disk 20.

The optical disk 20 including a recording layer on a substrate into which no data has been recorded (namely, the original disc 20) is rotated by a disk motor 21. A beam spot flashing in accordance with a specified signal is converged on the recording layer by an optical head 22 to record the wobble marks 3 through 6, the clock marks 7, the odd flags 13 and the even flags 14 on the recording layer. A line of recorded marks and flags form a track. The optical head 22 is moved slowly in the radial direction of the optical disk 20 by a traverse mechanism 23 in phase with the rotation of the optical disk 20 so as to form the tracks in a spiral pattern. Since the optical head 22 moves 1 μm while the original disk 20 is rotated once, the track pitch is 1 μm. The optical head 22 may be moved in a stepwise manner to form the tracks in a pattern of concentric circles.

A clock generator 27 generates a bit clock corresponding to each time unit which is used for recording the marks and the flags. In synchronization with the bit clock generated by the clock generator 27, a formatter 24 generates a signal for recording the marks and flags on the original disk 20. A modulator 26 modulates a light beam generated by a laser 25 to flash it in accordance with the signal generated by the formatter 24. The modulated light beam is directed to the optical head 22 through a deflector 31.

The bit clock generated by the clock generator 27 is also divided by a first frequency divider 28 into 1/n frequency division signals. A motor driver 29 drives the disk motor 21 so that the 1/n frequency division signal and an FG pulse generated m times while the disk motor 21 which is rotated once so they can be in synchronization with each other.

The 1/n frequency division signal is further divided into 1/m by a second frequency divider 30 to generate a pulse while the disk motor 21 is rotated once. In accordance with such a pulse, the formatter 24 increments the number of each track to generate a signal corresponding to each track.

While the optical head 22 is scanning the data area 12, the intensity of the beam spot is modulated in accordance with the data to be recorded, and the marks corresponding to the change in the intensity are recorded. For producing an optical disk for allowing data to be recorded in the data area 12 after the completion of the optical disk as a product, substantially no data is recorded in the data area 12 except for the address and the like. While the beam spot is scanning the first and the second servo areas 8 and 10, positions for wobbled marks 3 through 6 in the original disk 20 are irradiated by the beam spot at a specified timing to form the wobbled marks. The positions to be irradiated can be adjusted by deflecting the beam spot from the laser 25 using the deflector 31 such as an acousto-optic device or an electro-optic device.

The wobbled marks 3 through 6 are recorded in the following manner.

In order to record the wobbled marks 3 and 4 in the first servo areas 8, the modulator 26 is supplied with a signal for allowing the light from the laser 25 to pass the modulator 26. Simultaneously, the deflector 31 is supplied with a signal for deflecting the light beam transmitted through the modulator 26. Since the wobbled marks 3 and 4 are not recorded in the second servo area 10 of the odd number track 1, the formatter 24 outputs a signal for recording the wobbled marks 3 and 4 only in the first servo areas 8.

When the original disk 20 is rotated once, the mark-recording on the odd number track 1 is completed. For mark-recording on the even number track 2, signals are outputted for recording the wobbled marks 5 and 6 only in the second servo areas 10 in the same manner as for the odd number track 1. In the case that there are an odd number of segments 15a and 15b in each track, the timing for recording the wobbled marks is easily controlled by a setting so that two wobbled marks can be recorded in every other servo areas. In this manner, when the area for recording is changed from the odd number track 1 to the even number track 2, the positions for recording the wobbled marks are automatically changed from the first servo areas 8 to the second servo areas 10. Accordingly, it is not necessary for the formatter 24 to change the timing for outputting the signal for recording the wobbled marks in accordance with the track identification number. In the case when there are an odd number of segments 15a and 15b in a sector, the number of the first servo areas 8 is larger than the number of the second servo areas 10 by one, or the number of the second servo areas 10 is larger than the number of the first servo areas 8 by one. In the first servo area 8 which does not correspond to any of the second servo areas 10 or in the second servo area 10 which does not correspond to any of the first servo area 8, a code which does not exist in the access code can be recorded as an index instead of the access code. In this manner, tracks are formed in the original disk 20.

The marks recorded in the original disk 20 are formed into pits by optically developing the recording layer. The original disk 20 with such pits is coated with a plating layer and then the plating layer is peeled off to obtain a stamper having a pattern indicating the pits. Such a stamper is transferred to resin substrates by resin molding to duplicate the original disk 20 in a large numbers.

EXAMPLE 2

Figure 4:
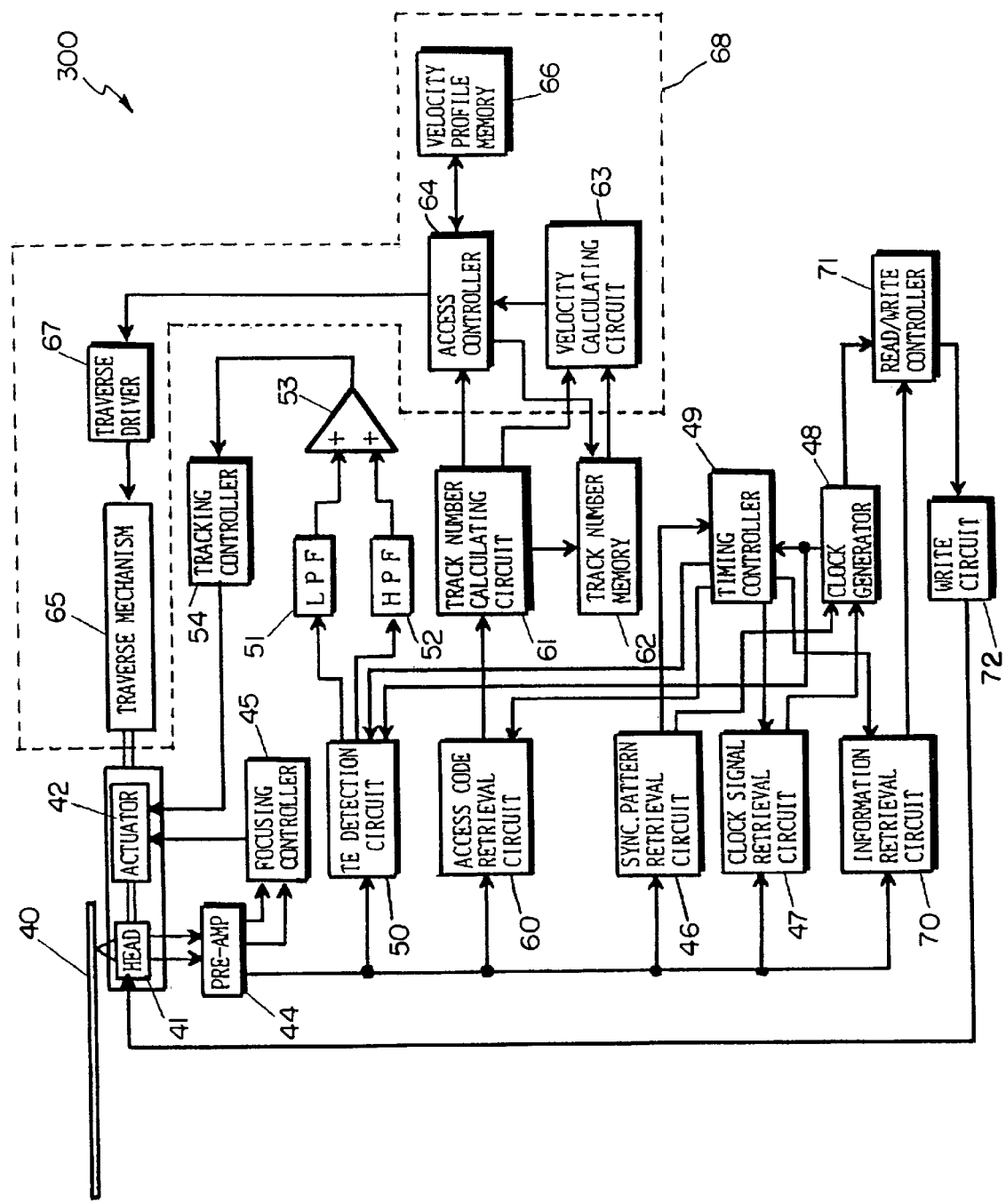
FIG. 4 is a block diagram of a recording/reproducing apparatus for recording data on, or reproducing data from a recording medium according to the present invention.

Referring to FIGS. 4 and 9, a second example according to the present invention will be described.

FIG. 4 is a block diagram of a recording/reproducing apparatus 300 in the second example according to the present invention. The recording/reproducing apparatus 300 records data on and reproduces data from an optical disk 40. The optical disk 40 includes tracks having similar marks and flags as those mentioned in the first example. In the second and the following examples, identical elements with those in the first example bear identical reference numerals therewith.

The recording/reproducing apparatus 300 operates in the following manner.

An optical head 41 converges a light beam on the optical disk 40 to form a beam spot. The light reflected on the optical disk 40 is received and transformed into a plurality of current signals by a plurality of photodetectors (not shown). A pre-amplifier 44 receives the plurality of current signals sent from the photodetectors and converts the current signals into voltage signals, respectively. A signal representing the difference between the voltage signals (hereinafter, referred to as the "difference signal") and a signal representing the sum of the voltage signals (hereinafter, referred to as the "sum signal") are generated by the pre-amplifier 44.

The difference signal acts as a focusing error signal which is changed in accordance with a focusing error of the beam spot. The focusing error signal is sent to a focusing controller 45. The focusing controller 45 drives an actuator 42 in accordance with the focusing error signal to adjust the direction of the axis of the beam spot. In this manner, the beam spot is accurately focused on the optical disk 40.

The sum signal generated by the pre-amplifier 44 is changed in accordance with the marks recorded on the optical disk 40. A synchronization pattern retrieval circuit 46 detects a synchronization pattern from the sum signal and sends a synchronization pattern retrieval signal to a clock generator 48 and to a timing controller 49. The timing controller 49 includes a counter 140 for counting the clock. When the timing controller receives the synchronization pattern retrieval signal, the counter 140 is reset.

The clock generator 48 includes a PLL. When the clock generator 48 receives the synchronization pattern retrieval signal, the gain of the PLL is raised, and the PLL is pulled in so that the PLL can be in synchronization with a PLL pull-in area following the synchronization pattern (see FIG. 2). When the PLL is completely pulled in, the gain of the PLL is reduced to a normal level. The PLL pull-in area includes marks arranged at an equal interval. Since the interval has a relationship represented by the ratio of integers with the interval between adjacent clock marks, the PLL can be in synchronization with the clock marks once the PLL is thus pulled in.

The timing controller 49 sends a gate pulse to a clock signal retrieval circuit 47 while the value of the counter 140 is within a specified range including a value expected to be obtained when the beam spot passes the clock mark 7. The clock signal retrieval circuit 47 recognizes the mark detected within such a range as a clock mark, and sends a clock mark timing pulse to the clock generator 48. The clock mark timing pulse indicates the timing at which the center of the clock mark is detected. The PLL included in the clock generator 48 is locked so that the phase of the oscillating clock has a specified relationship with the clock mark timing pulse. In this manner, a clock system is established.

The above-described operation will be described in detail with reference to FIG. 9.

FIG. 9 is a block diagram illustrating the clock generator 48, the timing controller 49, the tracking error detection circuit 50 and a high pass filter 52. Immediately after start of the operation of the recording/reproducing apparatus 300, the PLL included in the clock generator 48 is not in synchronization with a signal from the optical disk 40. While the PLL is not in synchronization with the signal from the optical disk 40, a voltage-controlled oscillator (hereinafter called) a VCO 132 is oscillated at a reference frequency corresponding to the clock of the signal from the optical disk 40. When the synchronization pattern retrieval circuit 46 finds a synchronization pattern from the sum signal outputted by the preamplifier 44 without relying on the clock outputted by the clock generator 48, the synchronization pattern retrieval circuit 46 sends a synchronization pattern detection signal to the clock generator 48 and the timing controller 49. As is illustrated in FIG. 2, a PLL pull-in area is located after the synchronization pattern, and a specified number of unit marks each corresponding to every three clocks are formed in the PLL pull-in area. While the PLL pull-in area is reproduced, the synchronization pattern detection signal is continuously outputted. While the synchronization pattern detection signal is outputted, the gain of a loop filter 131 is raised, and a switch 135 sends a signal obtained by dividing the output from the VCO 132 into ⅓ by a divider 134 to a phase comparator 130. In this manner, the PLL including the phase comparator 130, the loop filter 131, the VCO 132 and the divider 134 is locked. When the synchronization pattern detection signal disappears after passing through the PLL pull-in area, the gain of the loop filter 131 is reduced and the switch 135 is switched to the input state of the normal operation.

When the timing controller 49 receives the synchronization pattern detection signal, the counter 140 loads the value stored in a preset value storage 141. The preset value storage 141 counts the clock outputted by the VCO 132 using the loaded value as the initial value. The preset value is such a value as to cause a carry to be generated from the counter 140 when a clock corresponding to one segment is counted. In a first value storage 143, a value expected to be counted by the counter 140 corresponding to the position of the wobbled mark 3 or 5 in the servo area is stored therein. When the value stored in the first value storage 143 equals the value counted by the counter 140, a comparator 142 sends a wobbled mark detection signal to a shift register 146. The shift register 146 operates in the reverse clock phase with respect to the clock outputted by the VCO 132. The shift register 146 immediately outputs the value gotten in the input from the comparator 142 in synchronization with the reverse clock from Q0. Thereafter, the value is transferred sequentially from Q1 to Q2, . . . Q7. By performing OR of the outputs Q1, Q2 and Q3 from the shift register 146, a pulse having a time width ranging from 1.5 clock before and 1.5 clock after the expected time of the peak of the detection signal of the clock mark 7. This pulse is sent to the clock signal retrieval circuit 47 as a gate pulse. When the clock sign al retrieval circuit 47 finds the peak of the sum signal while the gate pulse is being inputted, the clock signal retrieval circuit 47 judges the peak as the center of the clock mark 7, and sends the clock mark timing pulse indicative of the peak position to the phase comparator 130. The phase comparator 130 compares the phase of the clock mark timing pulse and the phase of the output Q2 from the shift register 146. Practically, the phases of the above-mentioned signals are compared after being adjusted by a delay line 133. Accordingly, a clock in synchronization with the clock mark 7 is obtained from the PLL. In this manner, a clock system is established.

The synchronization pattern and the clock mark 7 are located at an identical angular position on all the tracks and arranged along the radial direction of the optical disk 40. Therefore, the synchronization pattern and the clock mark 7 can be read even without tracking control. Accordingly, clocking can be established prior to tracking control.

When the clock system is established, the timing controller 49 counts the clock, and outputs a strobe pulse to a tracking error detection circuit 50 at a time when the signals corresponding to wobbled marks are to be read. Practically, while the optical head 41 is tracking the odd number track 1, the timing controller 49 outputs a first strobe pulse when signals each corresponding to wobbled marks 3 and 4 are to be read, and outputs a second strobe pulse when signals each corresponding to wobbled marks 5 and 6 are to be read. While the optical head 41 is tracking the even number track 2, the timing controller 49 outputs a first strobe pulse when signals each corresponding to wobbled marks 5 and 6 are to be read, and outputs a second strobe pulse when signals each corresponding to wobbled marks 3 and 4 are to be read.

In short, the timing controller 49 outputs a first strobe pulse when signals corresponding to the wobbled marks formed simultaneously with the track being tracked are to be read, and outputs a second strobe pulse when signals corresponding to the wobbled marks formed simultaneously with the track adjacent to the track being tracked are to be read.

Data is recorded on the optical disk 40 in the following manner.

The tracking error detection circuit 50 generates a first detection signal and a second detection signal. The first detection signal is obtained by comparing the levels of signals corresponding to the wobbled marks 3 and 4 or wobbled marks 5 and 6 which are sampled and held in accordance with the first strobe pulse. The second detection signal is obtained by comparing the levels of signals corresponding to the wobbled marks 3 and 4 and wobbled marks 5 and 6 which are sampled and held in accordance with the first and the second strobe pulses. Then the tracking error detection circuit 50 outputs a first tracking error signal and a second tracking error signal. The first tracking error signal is one of the first detection signal and the second detection signal. The second tracking error signal consists of the first detection signal and the second detection signal.

The above-described operation will be described in detail with reference to FIG. 9.

When the clock system is established, a signal corresponding to the timing of each mark in the servo area is obtained from the timing controller 49. An A/D converter 120 samples a sum signal every clock and digitally converts the sum signal. A half clock after the A/D converter 120 samples the sum signal corresponding to the wobbled marks 3 and 5, a first timing pulse is outputted from Q0 of the shift register 146. A latch 121 is triggered at the rising edge of the first timing pulse and maintains the value obtained by conversion by the A/D converter 120. A half clock after the AD converter 120 samples the sum signal corresponding to the wobbled marks 4 and 6, a second timing pulse is outputted from Q6 of the shift register 146. A subtracter 122 is triggered at the rising edge of the second timing pulse and obtains the difference between the value maintained by the latch 121 and the value converted by the A/D converter 120 immediately before. The result is maintained by the subtracter 122. The value maintained by the subtracter 122 acts as a tracking error signal representing a tracking error detected in each servo area.

One clock after the subtracter 122 maintains the tracking error signal, a third timing pulse is outputted from Q7 of the shift register 146. A flip-flop 147 included in the timing controller 49 is set 80 that a carry of the counter 140 is sent to an input T thereof. Accordingly, the state of the flip-flop 147 is inverted every segment. A value obtained by performing AND of the output from the flip-flop 147 and the third timing pulse is supplied to the latch 123 as a trigger. In other words, the latch 123 is supplied with either one of the first strobe pulse and the second strobe pulse as a trigger. A latch 124 is supplied with a value obtained by performing AND of the inversion output from the flip-flop 147 and the third timing pulse as a trigger. In other words, the latch 124 is supplied with the other strobe pulse as a trigger. As a result, one of a first detection signal and a second detection signal is stored in the latch 123 and the other detection signal is stored in the latch 124. By inverting the state of the flip-flop 147 by an external control signal, the first or second detection signal stored in the latch 123 can easily be changed to the second or first detection signal.

FIG. 9 further illustrates the high pass filter 52 including a subtracter 152. By controlling channel selectors 150 and 151 in accordance with the state of the flip-flop 147, the subtracter 152 alternately subtracts the value corresponding to the previously sampled first or second detection signal from the value corresponding to the last sampled first or second detection signal and subtracts the value corresponding to the last sampled second or first tracking error signal from the value corresponding to the previously sampled second or first tracking error signal. In this manner, only a high frequency component of the first and second detection signal, which is the second tracking error signal, which is the second tracking error signal, can be extracted by a simple structure.

A high frequency component of the first tracking error signal, which is one of the first detection signal and the second detection signal, is removed by a low pass filter 51. A low frequency component of the second tracking error signal is removed by the high pass filter 52. Then, the first and the second tracking error signals are added together by an adder 53. The output from the adder 53 is sent to a tracking controller 54. The tracking controller 54 drives the actuator 42 in accordance with the output from the adder 53 to adjust the position of the beam spot on the track. In this manner, tracking control is performed. When tracking control is established and the address in which data is to be recorded is found, a read/write controller 71 receives data to record on the optical disk from an external device and sends the data to a write circuit 72. The write circuit 72 drives the optical head 41 to record the data on the optical disk 40.

As is mentioned above, in a low frequency band including a DC component, tracking control is performed based on the first tracking error signal which is detected from the wobbled marks recorded simultaneously with the track being tracked. Due to such a system, the optical head 41 accurately tracks the center of the track in which the data is to be recorded. Even if the distances between adjacent tracks are not uniform, the optical head 41 accurately tracks the center of the track since tracking control is not influenced by signals detected from the wobbled marks formed simultaneously with the adjacent tracks.

Data recorded on the optical disk 40 is reproduced in the following manner.

The tracking error detection circuit 50 outputs a first tracking error signal and a second tracking error signal. The first tracking error signal is obtained by comparing the levels of signals corresponding to the wobbled marks 3 and 4 or wobbled marks 5 and 6 which are sampled and held in accordance with the second strobe pulse. In other words, the first tracking error signal is generated based on the wobbled marks formed simultaneously with the track adjacent to the track storing the data to be reproduced. Except for this point, the process for reproduction is identical with the process for recording. When tracking control is established in this manner, the data recorded in the track which is being tracked can be read in a satisfactory state. When the address storing the data to be reproduced is found, a reproducing signal is outputted to an external device so as to perform reproduction.

As is mentioned above, in a low frequency range including a DC component, tracking control is performed based on the tracking error which is detected from the wobbled marks formed simultaneously with the tracks adjacent to the track storing the data to be reproduced. Due to such a system, the optical head 41 accurately tracks the center of the two tracks adjacent to the track storing the data to be reproduced. Accordingly, the crosstalk from the adjacent tracks can be kept to a minimum level.

For both recording and reproduction, in a high frequency range, tracking control is performed based on signals representing the tracking errors detected in all the first and the second servo areas 8 and 10. Accordingly, the frequency band in which tracking control is possible can be as wide as in the conventional system by providing the first servo areas 8 and the second servo areas 10 in the same total number in each track as in the conventional optical disk.

The tracking error detection circuit 50 further samples sum signals obtained from the odd flags 13 and the even flags 14 and outputs the levels of the sum signals to the tracking controller 54. While the optical head 41 is tracking the odd number track 1, the levels of the signals obtained from the even flags 14 are referred to. While the optical head 41 is tracking the even number track 2, the levels of the signals obtained from the odd flags 13 are referred to. In this manner, the amount of the crosstalk is evaluated. By such evaluation, the tracking state and other states are monitored by the tracking controller 54.

EXAMPLE 3

Figure 5:
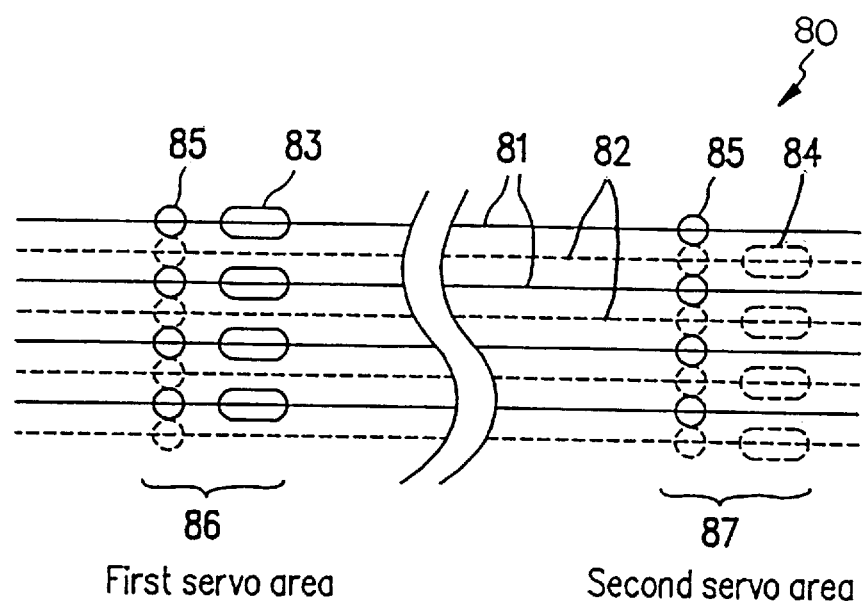
FIG. 5 is a conceptual view of a recording medium in another example according to the present invention.
Figure 6:
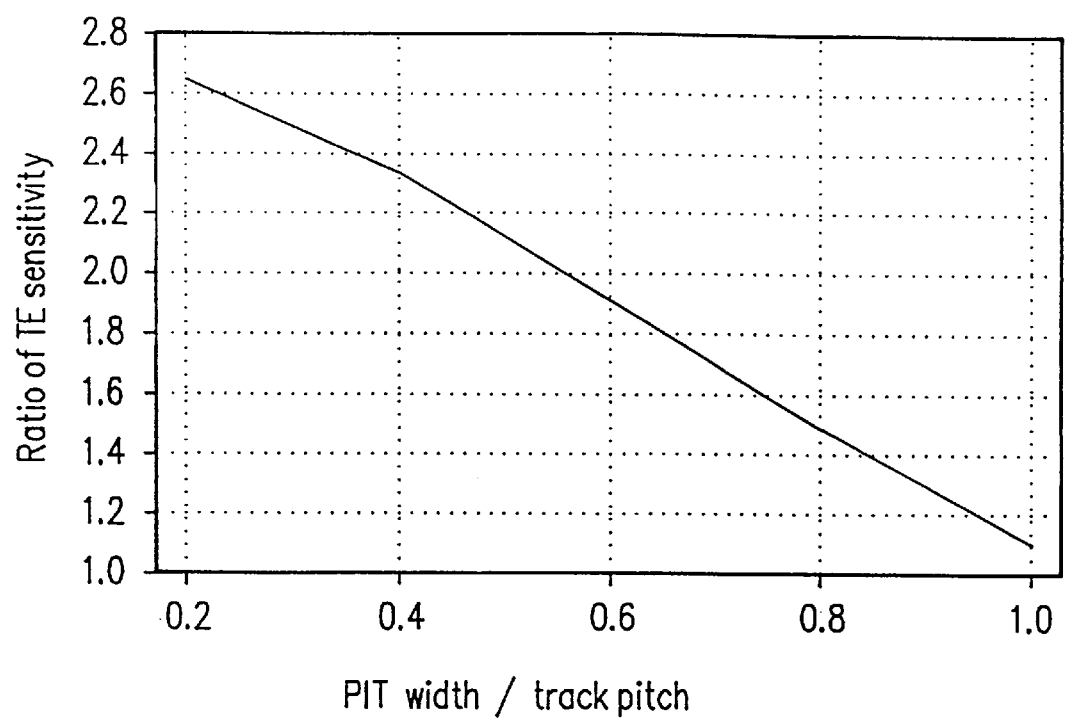
FIG. 6 is a graph illustrating fluctuation in the tracking error detection sensitivity obtained when the recording medium illustrated in FIG. 5 is used.

Referring to FIGS. 5 and 6, a third example according to the present invention will be described.

FIG. 5 schematically illustrates an optical disk 80 in the third example according to the present invention.

The optical disk 80 includes a plurality of first servo areas 86 and a plurality of second servo areas 87 (only one of each is shown in FIG. 5). The first servo areas 86 includes servo pits 83, and the second servo areas 87 includes servo pits 84, instead of wobbled marks. The servo pits 83 are provided on the center of odd number tracks 81, and servo pits 84 are provided on the center of even number tracks 82. Each first servo area 86 and each second servo area 87 has a clock pit 85 in each track for synchronizing the clocks.

Data recording on and data reproduction from such an optical disk 80 having the above-described structure is performed in a similar manner with the second example except for detection of the tracking error signals.

The tracking error signals are obtained in the following manner in the third example.

Light reflected by the optical disk 80 when the beam spot passes the servo pits 83 and 84 is received by a photodetector (not shown), and thus intensity distribution of the reflected light is detected. The asymmetry of the power distribution of the reflected light (namely, the difference in intensity between two halves of the reflected light) is used as the tracking error signal. A method for generating the tracking error signal based on the servo pits on the tracks of the optical disk is disclosed in the U.S. Pat. No. 4,491,940.

As is disclosed in, for example, the U.S. Pat. No. 4,057, 833, a tracking error can be detected using the phase difference between two signals detected based on two portions of a photodetector.

Generally in a system for detecting a tracking error using the phase difference, detection using signals obtained based on servo pits on the tracks adjacent to the track being tracked has higher sensitivity than detection using signals obtained based on servo pits on the track being tracked. As the ratio of such detection sensitivities is increased, the linear part of a curve representing the tracking error characteristic is reduced and thus the detection stability is reduced. Preferably, the ratio of such detection sensitivities is in the range of 0.5 to 2.

FIG. 6 is a graph illustrating the relationship between the servo pit width/track pitch ratio and the above-mentioned ratio of tracking error detection sensitivities obtained when the tracking error is detected using the phase difference of signals representing the servo pits of the optical disk 80 illustrated in FIG. 5. From FIG. 6, it is preferable that the servo pit width is half or more of the track pitch. In the case where the servo pit width is too large, the distortion of the detected signal is sufficiently large to prevent accurate detection. Accordingly, it is preferable that the servo pit width is $\lambda/(2 \cdot NA)$ or less where $\lambda$ is wavelength of light, and NA is the numerical aperture of the objective lens converging the beam spot.

The tracking control for recording and reproduction is performed in the same manner as in the second example.

Data is recorded on the optical disk 80 in the following manner.

A first tracking error signal is generated based on a tracking error detected by signals obtained from the servo pits formed simultaneously with the track in which data is to be recorded. Accordingly, in a low frequency band including a DC component, tracking control is performed based on the servo pits formed simultaneously with the track being tracked. Due to such a system, the optical head 41 accurately tracks the center of the track with no influence from the adjacent tracks.

Data recorded on the optical disk 80 is reproduced in the following manner.

A first tracking error signal is generated based on signals obtained from the servo pits formed simultaneously with the tracks adjacent to the track storing the data to be reproduced. Accordingly, in a low frequency band including a DC component, tracking control is performed based on the servo pits formed simultaneously with such adjacent tracks. As a result, the optical head 41 tracks the center of such adjacent tracks, and thus the crosstalk from the adjacent tracks can be kept at a minimum level.

For both recording and reproduction, in a high frequency band of the tracking control, tracking control is performed based on signals representing the tracking errors detected in the servo pits in all the first and the second servo areas 86 and 87. Accordingly, the frequency band of the tracking control can be as wide as in the conventional system by providing the first servo areas 86 and the second servo areas 87 in the same total number in each track as in the conventional optical disk.

In the third example, the recording/reproducing apparatus 300 operates differently from the second example when detecting the odd flags 13 and the even flags 14 using the tracking error detection circuit 50 in addition to detecting the tracking error.

In the third example, the servo pits 83 and 84 are respectively on the center of the odd number track 1 and the even number track 2. Due to such a structure, the servo pits 83 and the servo pits 84 also act as the odd flag 13 and the even flag 14, respectively. Practically, in the case that the optical disk 80 illustrated in FIG. 5 is used, the tracking error detection circuit 50 detects the tracking error based on the servo pits 83 and 84, and also detects the levels of the sum signals based on the servo pits 83 and 84 and sends the levels to the tracking controller 54.

As is described in the first, second and third examples, according to the present invention, satisfactory tracking control can be realized, in different tracking error detection methods.

EXAMPLE 4

In the previous three examples, tracking control for recording or reproducing data along the tracks is mainly described. Such tracking control is performed using servo marks such as wobbled marks or servo pits formed in two types of servo areas.

In a fourth example according to the present invention, operation for seeking a target track including a target address will be described. The seek for the target address (hereinafter, referred to as "access control") is performed using a first access code and a second access code formed in two types of servo areas.

Returning to FIG. 1, the first servo area 8 includes eight different types of first access codes 9. Each of the eight types of first access codes 9 is repeated for eight tracks in succession. Accordingly, the eight types of first access codes 9 are repeated every 64 tracks as one cycle. The second servo area 10 includes the same eight types of codes as the second access codes 11. Here, the eight types of second access codes 11 are on successive eight tracks, respectively. Accordingly, the eight types of second access codes 11 are repeated every eight tracks as one cycle. An access code corresponding to each track includes the combination of the first access code 9 and the second access code 11 of the track. In each track, there are 800 first servo areas 8 and 800 second servo areas 10 with an equal interval to each other. Accordingly, when the optical disk 20 is rotated at the velocity of 30 rotations per second, the interval between the time for sampling a first access code 9 and the time for sampling a second access code 11 is approximately 20 μs. Therefore, a time period required for recognizing an access code corresponding to each track is approximately 40 μs.

As shown in FIG. 1, with respect to the first servo area 8, the tracks n through n+79 are divided into sets of adjacent tracks (for example, sets A through J). In this example, each set includes eight adjacent tracks. For example, set A includes tracks n through n+7, set B includes tracks n+8 through n+15, and so on. The adjacent sets of tracks are grouped together so that there are eight sets of tracks (for example, A through H) in each group, and each set of tracks in a group has a unique first access code 9. The additional sets of tracks are also grouped together so that set I has the same first access code 9 as set A does, set J has the same first access code 9 as set B, and so on. In other words, the group of the first access codes 9 is repeated in a cycle of 64 tracks.

With respect to the second servo area 10, each track in a set has a different second access code 11, and the second access codes 11 repeat in each set of tracks. Track n+8 has the same second access code 11 as track n does, track n+9 has the same second access code 11 as track n+1 does and so on. In other words, the second access code 11 is repeated in a cycle of eight tracks. Furthermore, the second access code 11 of track n is the same as the first access code 9 of tracks n through n+7, the second access code 11 of track n+1 is the same as the first access code 9 of tracks n+8 through n+15, and so on.

An access code includes the combination of the first access code 9 and the second access code 11 of each track. The access code of track n+64 has the same combination of the first and the second access codes 9 and 11 as that of track n. In other words, the access code including the first and the second access codes 9 and 11 is repeated in a cycle of 64 tracks. The access code of track n is the same as the access code of track n+64, the access code of track n+1 is the same as the access code of track n+65, and so on.

Preferably, the first access codes 9 are aligned in a radial direction of the optical disk 20; and the second access codes 11 are aligned in a radial direction of the optical disk 20.

In the recording/reproducing apparatus 300 illustrated in FIG. 4, the optical head 41 is tracking a certain track before access control starts. The read/write controller 71 detects an address from the data read from the track and sends the track identification number indicating the track having such an address to an access controller 64. The access controller 64 stores the track identification number in a track number memory 62. The track number memory 62 has a capacity for storing eight track identification numbers. The track number memory 62 is filled with the track identification numbers of the tracks being tracked sent from the access controller 64. The track identification number stored in the track number memory 62 is represented by A(0).

When the access controller 64 is commanded by an external device to access a target track, access control is performed by an access control section 68 to move the optical head 41 to the target track. The access control section 68 includes a velocity calculating circuit 63, the access controller 64, a velocity profile memory 66, a traverse driver 67, and a traverse mechanism 65.

Such access control will be described, hereinafter.

The access controller 64 calculates the difference between the track identification number of the track currently being tracked and the track identification number of the target track. The access controller 64 then finds a reference velocity of the optical head 41 corresponding to the difference between the track identification numbers, by referring to the velocity profile memory 66. The reference velocity is substantially in proportion to the square of the number of tracks which should be crossed by the optical head 41 before the optical head 41 reaches the target track. In the case where such a number of tracks is a specified value or more, the reference velocity is determined to be a certain value.

When the optical head 41 starts to move, an access code retrieval circuit 60 extracts a second access code 11 from the second servo area 10. At the beginning of the movement, the detected velocity of the optical head 41 is lower than the reference velocity, and therefore the optical head 41 is accelerated with the maximum acceleration of the traverse mechanism 65. The acceleration is approximately 10 G (G: acceleration of gravity). The time period after the start of the movement until a second access code 11 is read by the velocity calculating circuit 63 for the first time is approximately 40 $\mu$s at the longest, and so the optical head 41 moves 0.08 $\mu$m at the maximum during such a time periods Where the track pitch is 1 $\mu$m, the distance of approximately 0.08 $\mu$m is 1/10 or less of the track pitch. Accordingly, the value m(1) of the first access code 9 and the value n(1) of the second access code 11 do not change between before and after such a time period. Accordingly, the track identification number A(1) obtained by the track number calculating circuit 61 is not changed, either. Hereinafter, m(i) refers to the value of the ith first access code 9 which is read by the optical head 41 at the ith time, and n(i) refers to the value of the ith second access code 9 which is read by the optical head 41 at the ith time. In the specification, the "ith" first or second access code means the first or second code which is read at the ith time. A(i) refers to the track identification number obtained based on values m(i) and n(i). Accordingly, m(1) refers to the value of the first access code 9 which is read at the first reading, and n(1) refers to the value of the second access code 11 which is read at the first reading. A(1) refers to the track identification number obtained based on values m(1) and n(1).

The value of the access code changes for the first time when the distance that optical head 41 has moved exceeds half the track pitch. The time period necessary for the optical head 41 to move half the track pitch, namely, 0.5 $\mu$m is 100 $\mu$s. Accordingly, the value of the access code is still not changed when the optical head 41 reads an access code at the second reading. When the optical head 41 reads an access code at the third reading, the value of n(3) of the second access code 11 is incremented by 1. In the case where the value n(0) of the second access code 11 is 7 when the optical head 41 reads the second access code 11 at the second reading, the value 7 is incremented by 1 at the third reading to return to 0. Generally expressed, where the optical head 41 crosses x number of tracks after the ith second access code 11 is read after the ith second access code 11 is read until the (i+1)th second access code 11 is read, the value n(i+1) is expressed by Equation (1).

$$n(i+1) = \{n(i)+x\} \bmod 8 \quad (1).$$

Where the optical head 41 crosses y number of tracks after the ith first access code 9 is read until the (i+1)th first access code 9 is read.

$$\begin{aligned} m(i+1) &= \{m(i) + [y/8]\} \bmod 8, \text{ or} \\ &= \{m(i) + [y/8] + 1\} \bmod 8 \end{aligned} \quad (2)$$

([ ] is a Gauss symbol, and indicates the maximum integer not exceeding the value shown in the symbol.)

At this point, the value of the lower 6 bits of the track identification number A(i+1) from which the value n(i+1) of the second access code 11 is read cannot be calculated as expressed by Equation (3).

$$A(i+1) = m(i+1) \cdot 8 + n(i+1). \quad (3)$$

The reason is that the value m(i+1) of the first access code 9 is read 20 $\mu$s before the value n(i+1) of the second access code 11 is read. After the moving velocity of the optical head 41 exceeds a certain level, the optical head 41 crosses a plurality of tracks within 20 $\mu$s. Therefore, the first access code 9 and the second access code 11 detected by the optical head 41 belong to different tracks.

In order to find the value of the first access code 9 which belongs to the same track as the track from which the value n(i+1) of the second access code 11 is read, the track number calculating circuit 61 estimates the track identification number(namely, track address) which is closest to the track identification number linearly predicted on the change of the track identification numbers which have already been detected. Practically, the track identification number A'(i+1) to be obtained at the (i+1)th time is predicted as follows based on the track identification number A(i-1) estimated from the (i-1)th first access code 9 and the (i-1)th second access code 11 and also based on the track identification number A(i) estimated from the ith first access code 9 and the ith second access code 11.

$$\begin{aligned} A'(i+1) &= A(i) + \{A(i) - A(i-1)\} \\ &= 2A(i) - A(i-1) \end{aligned} \quad (4)$$

When the value n(i+1) of the (i+1)th second access code 11 is read, the track number calculating circuit 61 estimates the value m(i+1) of the first access code 9 so that the track having (i+1)th second access code 11 has the track identification number closest to A'(i+1) which is obtained from Equation (4). Based on the estimated value m(i+1), the track identification number A(i+1) of the (i+1)th track is clacuated.

When the value n(i) of the ith second access code 11 cannot be read, the track identification number A(i) cannot be estimated. The data indicating that the track identification number A(i) cannot be estimated is stored in the track number memory 62, in an area in which the track identification number A(i) is to be stored. In such a case, the track identification number A(i+1) can be estimated based on the track identification numbers A(i−1) and A(i−2) estimated when the value n(i+1) of the (i+1)th second access code 11 is read.

The above-described linear prediction of the change of the track identification numbers is performed under the assumption that the moving velocity of the optical head 41 is kept constant. In the case that the optical head 41 is accelerated with such a large acceleration as 10 G, prediction errors easily occur. However, such prediction errors are as small as 0.3 μm since the sampling cycle is as short as 40 μs. Even if such a prediction error is added with a quantization error caused by a stepwise change of the values of the access codes with every track(the quantization error corresponds to 1.5 times the track pitch, and is 1.5 μm in this example), the total error is twice the track pitch or less. Considering that a prediction error is tolerated up to three tracks since one cycle of the second access codes 11 is eight tracks, it is clear that the track identification number A(i+1) can accurately be done.

After the track identification number A(i) or A(i+1) is estimated, the access controller 64 calculates the number of tracks that the optical head 41 should cross to reach the target track, and reads the reference velocity corresponding to such a number of tracks by referring to the velocity profile memory 66. The velocity calculating circuit 63 calculates the moving velocity of the optical head 41 based on the track identification number A(i+1) and the track identification number estimated therebefore. The access controller 64 compares the moving velocity obtained by the calculation and the reference velocity, and sends a signal to the traverse driver 67 to drive the traverse mechanism 65 so as to compensate for the difference. In this manner, the optical head 41 is controlled so that the moving velocity thereof can change in accordance with the change in the reference velocity and is moved to the target track in deceleration. 1625

When the optical head 41 reaches the vicinity of the target track, the reference velocity is fixed to a predetermined value around several millimeters per second. Thereafter, the moving velocity is kept at the predetermined value until the optical head 41 reaches the target track. This stage is so called as a pedestal stage. At such a low velocity, the optical head 41 moves only approximately 0.1 μm within 20 μs after a first access code 9 is read until a second access code 11 is read. Accordingly, the first access code 9 and the second access code 11 on the identical track can easily be read. By comparing the estimated track identification number A(i) with the value m(i) of i-th first access code 9 and the value n(i) of the i-th second access code 11, wrong estimation in track identification number A(i) can easily be repaired even if the estimated value A(i) is different from the correct value by one or two cycle(s) of the second access code 11.

However, at such a low velocity, the track identification numbers do not change frequently. Therefore, it is difficult to detect the moving velocity of the optical head 41 based on the change in the track identification numbers. In such a case, the moving velocity can be detected based on the change in the tracking error signals detected by the tracking error detection circuit 50, change in the levels of sum signals obtained from the odd and the even flags 13 and 14, or in the case of the optical disk 80 illustrated in FIG. 5, the change in the levels of the sum signals obtained from the servo pits 83 and 84.

In both the method for detecting the moving velocity of the optical head 41 based on the change in the tracking error and the method for detecting the moving velocity of the optical head 41 based on the change in the levels of the sum signals, detection sensitivity changes periodically. Since variation phase of these two methods are shifted by 90° from each other, whichever method having a larger absolute value of the detection sensitivity can be adopted. Thus, stable velocity detection is realized. In this manner, the optical head 41 moves at a low velocity and easily stops when reaching the target track. Due to such a system, the optical head 41 can immediately follow the target track.

According to the methods described in the fourth example, the number of tracks crossed by the optical head 41 may alternatively be counted in the following way, only by a cumulating the changes in the arrangement of the access codes which have been read.

The second access codes 11 varies track by track, and one cycle covering all the variations of the second access codes 11 corresponds to eight tracks. If the number of tracks crossed by the optical head 41 is three or less within the interval between two sampling times for the second access codes 11, the number of the tracks can accurately be counted only using the second access codes 11. In the fourth example, since the track pitch is 1 μm and the interval between two sampling times is 40 μs, the number of the tracks can be counted by using the second access codes 11 only if the moving velocity of the optical head 41 is 75 mm/s or less.

In the case that the moving velocity of the optical head 41 is more than 75 mm/s, the number of the tracks can be counted at the resolution of eight tracks using the first access codes 9. If the number of tracks crossed by the optical head 41 during the interval between two sampling times is 25 or less, no counting error is generated since the arrangement of the first access codes 9 changes by three or less within the interval. Accordingly, if the moving velocity is 625 mm/s or less, tracks can accurately be counted.

Track counting using the first access codes 9 (resolution of eight tracks) involves large errors. However, such errors can be corrected by performing track counting using the second access codes 11 when the moving velocity of the optical head 41 is lowered in the vicinity of the target track. Since the moving velocity of the optical head 41 can be measured based on the number of access codes crossed by the optical head 41 between two sampling times (namely, the ratio of change of the access codes), access control can be performed while the velocity is controlled.

In the previous four examples, if the reference velocity is limited under 625 mm/s in the case that the first access Codes 9 varies by four or more per each interval between two sampling times, it is judged that the moving velocity of the optical head 41 exceeds a normal value. The moving velocity of the optical head 41 is immediately reduced, and thus damages which would occur by collision of the optical head 41 against a member of the device can be prevented.

As has been described so far, according to the fourth example, the access codes in the optical disk are classified into two types having different cycles. These two types of access codes are arranged alternately and discretely. Due to such a structure, even if the access codes have a relatively small bit number, each cycle of the access code including two types of corresponding to each track can be long. By performing access control by combining the first and the second access codes in accordance with the moving velocity of the optical head 41, quick and accurate access control can be performed even if the optical head 41 moves at a high velocity.

EXAMPLE 5

A fifth example according to the present invention will be described with reference to FIG. 7.

Figure 7:
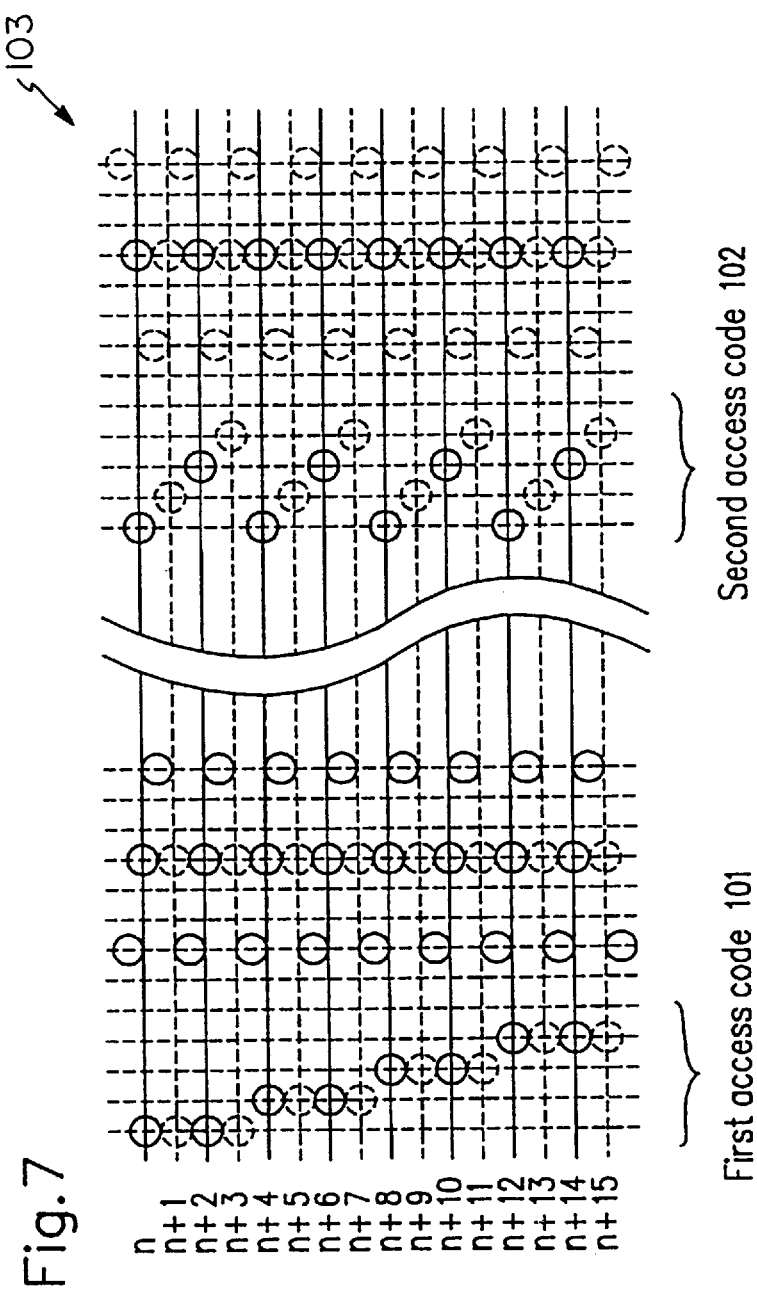
FIG. 7 is a conceptual view of a recording medium in still another example according to the present invention.

FIG. 7 is a conceptual view of access codes of a recording medium 103 in the fifth example according to the present invention. In FIG. 7, tracks n through n+15 of the recording medium 103 are shown.

The recording medium 103 illustrated in FIG. 7 is different from the optical disk 20,illustrated in FIG. 1 in that each set of tracks includes four adjacent tracks. The adjacent set of tracks are grouped together so that there are four sets of tracks in each group, and each set of tracks in a group has a unique first access code 101. In other words, the group of the first access codes 101 is repeated in a cycle of 16 tracks.

Each track in a set has a different second access code 102, and the second access codes 102 repeat in each set of tracks. For example, track n+4 has the same second access code 102 as track n does, track n+5 has the same second access code 102 as track n+1 does. In other words, the second access code 102 is repeated in a cycle of four tracks. Furthermore, the second access code 102 of track n is the same as the first access code 101 of tracks n through n+3, the second access code 102 of track n+1 is the same as the first access code 101 of tracks n+4 through n+7, and so on.

With respect to the access code including the first and the second access codes 101 and 102 of each track, the access code of track n+16 has the same combination of the first and the second access codes 101 and 102 as that of track n. In other words, the access code including the first access code and the second access code 101 and 102 is repeated in a cycle of 16 tracks.

Preferably, the first access codes 101 are aligned in a radial direction of the optical disk 103; and the second access codes 102 are aligned in a radial direction of the optical disk 103.

Data recording on and data reproducing from the recording medium 103 is performed by the recording/reproducing apparatus illustrated in FIG. 4 in the following manner.

In the fifth example, the cycle of the access codes is shorter than in the fourth example, and especially the second access codes 102 are repeated every four tracks. Accordingly, it is necessary to estimate the track identification number at the next sampling time with high accuracy 80 that the error can be restricted to two tracks or less.

In order to realize such accuracy, when the moving velocity of the optical head 41 is reduced to a specified level of lower, the track identification number A'(i+1) of the next estimation is calculated as expressed by Equation (5).

$$A'(i+1)=A(i)+\{A(i)-A(i-j)\}/j. \tag{5}$$

where j is a natural number of 2 or more.

In such calculations, for example, when j=4, even if the acceleration is approximately 10 G, the total error obtained by adding the error caused by the acceleration and the quantization error is approximately 1 μm at the maximum. Accordingly, the error for the estimated value is approximately 1track at the maximum.

Although such an error is small, this error is further suppressed in consideration of the error caused by acceleration in the fifth example. For example, while the optical head 41 Is being accelerated by the maximum acceleration of 10 G at the beginning of the movement, the moving distance of the optical head 41 obtained by linear predication is underestimated by approximately 0.4 μm. Accordingly, the estimated track identification number A'(i+1) obtained by Equation (5) is corrected by the number corresponding to the distance error of approximately 0.4 μm. While the moving velocity of the optical head 41 is reduced with reference to a velocity profile in the velocity profile memory 66, the error expected from the reference acceleration of the velocity profile is corrected. For example, the acceleration of 7 G is stored in the velocity profile for decelerating the optical head 41, the moving distance of the optical head 41 is overestimated approximately 0.3 μm based on the linear prediction of the change in the distance when the optical head 41 is decelerated. Accordingly, the distance is corrected by the erroneous value of approximately 0.3 μm caused by deceleration.

In this manner, among the tracks having the second access code 102 of the same value as n(i+1) of the second access code 102 which is obtained by correcting the estimated track identification number A'(i+1) by an error caused by acceleration expected from the velocity profile, the track having the track identification number which is closest to the estimated track identification number after correction is assumed to be the current track. The other tracks having the second access codes 102 of a value equal to the value of n(i+1) are distanced from the track currently being tracked by at least four tracks. Accordingly, if the estimation error of the track identification number is approximately one track, the track identification number A(i) can be accurately estimated.

In the case that, among the tracks including second access codes 102 of a value equal to the value of the second access code 102 which has been read, there are two tracks having the track identification number which is closest to the estimated track identification number after correction, for example, there are two tracks having the track identification numbers with an error of +2 and an error of −2 with respect to the estimated number, both two tracks are stored in the track number memory 62 without estimation. Assuming both of the tracks are correct, the track identification number when the value m(i+2) of the first access code 101 is sampled is estimated for each one of the tracks. The estimated value for each track is compared with the value m(i+2) of the first access code 101 which has actually been sampled, and the identification number of the track having the higher likelihood is determined to be the estimated track identification number A(i+1).

In the fifth example, the track identification number of the track from which the second access code 102 is read is estimated using the track identification number estimated at the previous time and another track identification number estimated at least two times before the previous time. Due to such a system, quantization error caused with the estimation of the track identification number is minimized to enhance estimating precision. As a result, even if the bit number of the access codes is reduced and shorten one cycle of the access codes, access control can be performed satisfactorily.

EXAMPLE 6

A sixth example according to the present invention will be described with reference to FIG. 8.

Figure 8:
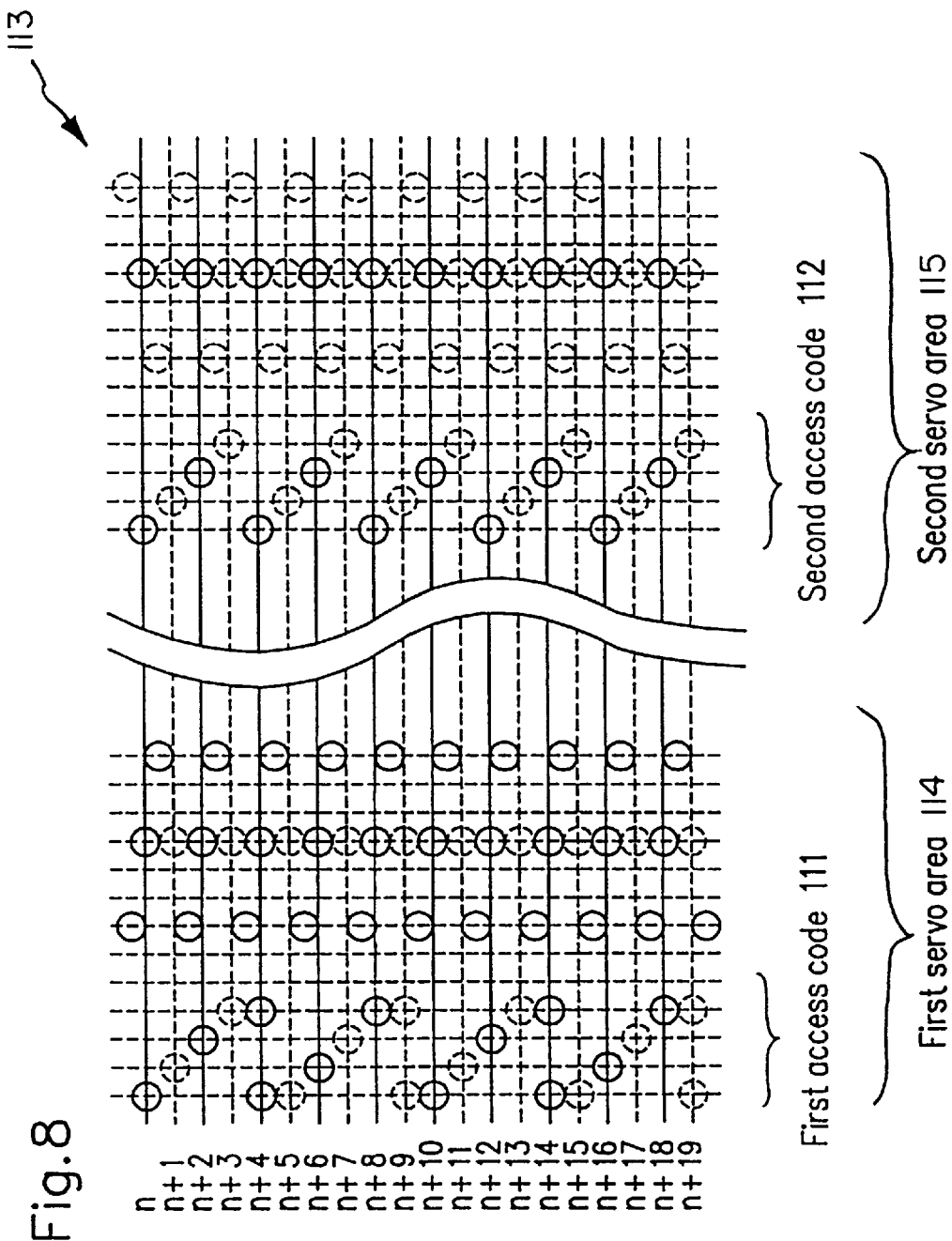
FIG. 8 is a conceptual view of a recording medium in still another example according to the present invention.

FIG. 8 is a conceptual view of access codes of a recording medium 113 in the sixth example according to the present invention. In FIG. 8, tracks n through n+19 of the recording medium 113 is shown.

In the recording medium 113 illustrated in FIG. 8, with respect to a first servo area 114, each set of tracks includes five adjacent tracks, and each track in a set has a unique first access code 111. The first access code 111 of track n is the same as the first access code of track n+5; the first access code 111 of track n+1 is the same as the first access code of track n+6; and so on. In other words, the first access code 111 is repeated in a cycle of five tracks.

With respect to a second servo area 115, each set of tracks includes four adjacent tracks, and each track in a set has a different second access code 112. The second access code 112 of track n is the same as the second access code of track n+4, the second access code 112 of track n+1 is the same as the second access code of track n+5, and so on. In other words, the second access code 112 is repeated in a cycle of four tracks.

An access code includes the combination of the first and the second access codes 111 and 112. The access code of track n has the same combination of the first and the second access codes 111 and 112 as that of track n+20. In other words, the access code is repeated in a cycle of 20 tracks.

Preferably, the first access codes 111 are aligned in the radial direction of the optical disk 113, and the second access codes 112 are aligned in a radial direction of the optical disk 113.

Data recording on and data reproducing from the optical disk 113 is performed by the recording/reproducing apparatus illustrated in FIG. 4 in the following manner.

In the sixth example, both the first access code 111 and the second access code 112 changes every track. Due to such a structure, the track identification number can be estimated with high accuracy by reading the first access code 111 or by reading the second access code 112. Accordingly, the track identification number can be estimated every 20 μs. In the case that the track identification number is estimated at the next sampling time 20 μs later based on equation (5), the error can be as small as approximately 0.8 μm. Such a small error, which is even smaller than one track pitch, brings no problem even if the second access codes 112 are repeated every four tracks.

Accordingly, the first and the second access codes 111 and 112 can be formed with a small bit number.

Further, the access code corresponding to each track, which includes a combination of the first access code 111 and the second access codes 112 is repeated every 20 tracks, which is the least common multiple of the number of tracks of the cycle of the first access codes 111 and the number of tracks of the cycle of the second access codes 112. Accordingly, even if access control is performed only based on the access codes corresponding to each track, the possibility of access to a wrong track can be kept low.

In the sixth example, the first and the second access codes 111 and 112 are repeated every five tracks and every four tracks respectively. However, the number of tracks for the cycle is not restricted to these numbers. As long as the numbers of tracks included in the cycle of the first and the second access codes do not have any common divisor except 1, the cycle of the access codes including both the first and the second access codes can be the least common multiple of these numbers.

In the fourth example, the access controller 64 performs precise velocity control in accordance with the velocity profile stored in the velocity profile memory 66. Alternatively, the access controller 64 may perform rough velocity control for roughly counting the tracks using the first access code 9 and maintaining the moving velocity of the optical head 41 at a certain level.

In the fourth example, in the case that the track identification number cannot be estimated, data indicating such a situation is stored in the track number memory 62. Instead, a predicted track identification number may be stored.

In some of the examples described above, an optical disk is used as the recording medium. The recording medium according to the present invention is not restricted to the one used in a recording/reproducing apparatus. The present invention is applicable to, for example, a magnetic recording medium or a recording medium from which data is reproduced using the change in electrostatic capacitance. For example, the marks illustrated in FIG. 1 may be all magnetic, in which case, a magnetic head is used instead of the optical head 41.

In the examples described above, the first servo areas (8 or 86) and the second servo areas (10 or 87) are alternately disposed. Instead, a plurality of groups of first servo areas and a plurality of groups of the second servo areas may be alternately disposed.

The wobbled marks 3, 4, and the wobbled marks 5, 6 may be exchanged in position. The first access code 9 and the second access code 11, and the odd flag 13 and the even flag 14 may also be exchanged in position.

As has been described so far, according to the present invention, two types of servo areas (namely, a first servo area and a second servo area) are formed on a recording medium. Servo marks for tracking control are formed along each track but in either the first or the second servo area. Practically, in the first servo area, only a servo mark of an odd number track is formed simultaneously with the track. In the second servo area, a servo mark of an even number track is formed simultaneously with the track. For recording data in the recording medium, in a low frequency band including a DC component, tracking control is performed based on the servo mark recorded simultaneously with formation of the track. Accordingly, the optical head can accurately track the center of the track in which data is to be recorded with no influence by the adjacent tracks.

For reproducing data recorded on the recording medium, tracking control is performed based on the servo mark recorded simultaneously with formation of the adjacent tracks. Accordingly, the optical head can track the center of the two adjacent tracks adjacent to the track from which data is to be reproduced, thereby minimizing the crosstalk from the adjacent tracks.

For both recording and reproduction, in a high frequency range, tracking control is performed based on the servo mark in all the first and the second servo areas. Accordingly, the frequency band in which tracking control is possible can be as wide as in the conventional system by providing the first servo areas and the second servo areas in the same total number in each track as in the conventional optical disk.

Satisfactory tracking control can be realized, irrespective of the tracking error detection method used.

Further, access codes are classified into two types having different cycles. These two types of access codes are respectively formed in two servo areas arranged alternately and discretely. Due to such a structure, even if the access codes have a relatively small bit number, each cycle of an access code corresponding to each track can be long. By performing access control by combining the first and the second access codes in accordance with the reference velocity profile of the optical head, quick and accurate access control can be performed even if the optical head moves at a high velocity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk-shaped recording medium, comprising:

a plurality of first tracks and a plurality of second tracks for recording data, the first tracks and the second tracks being alternately arranged in a radial direction on a surface of the recording medium in one of a pattern of concentric circles and a spiral pattern;

a plurality of first servo areas and a plurality of second servo areas discretely located at a plurality of respective specified rotation angular positions of the surface along a circumferential direction of the recording medium to be disposed alternately with each other in the circumferential direction;

a plurality of first servo marks and a plurality of second servo marks used for tracking control, each of said first and second servo marks including a pair of wobbled marks; and a plurality of clock marks used for synchronization, the clock marks being provided at an equal rotation angular interval along each of the first and second tracks in the first and second servo areas, wherein in the first servo areas the first servo marks are provided along each of the first tracks whereas no second servo marks are provided along the second tracks; in the second servo areas the second servo marks are provided along each of the second tracks whereas no first servo marks are provided along the first tracks, each of the paired wobbled marks is provided along the corresponding track, the paired wobbled marks being spaced each other along the corresponding track and displaced by a specific distance from the center of the corresponding track in opposite directions respectively, and the first servo areas are isolated from the second servo areas in the circumferential direction so that the first servo marks and the second servo marks are provided in the different servo areas from each other; and further including synchronization marks respectively provided at a plurality of specified angular positions along each of the first and the second tracks excluding the first and the second servo areas, the synchronization marks having a specified pattern which is different from any pattern of data in the recording medium; and mark rows respectively provided next to the synchronization marks along each of the first and the second tracks at a specified angular interval which is shorter than the rotation angular interval of the clock marks, and also has a relationship indicated by a ratio of integers with the rotation angular interval of the clock marks.

2. A disk-shaped recording medium according to claim 1, wherein the first and the second tracks form the spiral pattern, a total number of the first servo areas and the second servo areas in an odd number, and starting positions of the first servo areas and the second servo areas are arranged with an equal rotation angular interval.

3. A disk-shaped recording medium according to claim 1, wherein in the first servo areas the first servo marks are simultaneously formed with the first tracks whereas no second servo marks are simultaneously formed with the second tracks; and in the second servo areas the second servo marks are simultaneously formed with the second tracks whereas no first servo marks are simultaneously formed with the first tracks.

4. A disk-shaped recording medium according to claim 1, further including a first flag provided at a predetermined angular position along each of the first tracks in each of the first servo areas or in each of the second servo areas, and a second flag provided at a specified predetermined angular position along each of the second tracks in each of the second servo areas or in each of the first servo areas.

5. A disk-shaped recording medium according to claim 1, wherein the first servo marks are pits formed along the center of each of the first tracks, and the second servo marks are pits formed along the center of the second tracks.

6. A disk-shaped recording medium according to claim 5, wherein the recording medium is an optical disk used for data recording and reproduction using a light beam spot obtained by converging light having a wavelength of $\lambda$ by an objective lens having a numerical aperture of NA, each of the pits having a width which is at least half a pitch of each tracks of consisting of the first and the second tracks and at most $\lambda/(2 \cdot NA)$.

7. A disk-shaped recording medium according to claim 1, further including:

a first access code and a second access code recorded along each of the first and the second tracks, wherein the first access codes are provided in the first servo area and repeated in the radial direction of the recording medium according to a first cycle, each cycle including a first number of tracks, and the second access codes are provided in the second servo area and repeated in the radial direction of the recording medium according to a second cycle, each second cycle including a second number of tracks, which is different from the first number of tracks.

8. A disk-shaped recording medium according to claim 7, wherein the second cycle includes M different second access codes, respectively corresponding to M tracks included in the second cycle, where M is an integer, and the first cycle includes N different first access codes, each different first access code being repeated along M adjacent tracks, whereby each first cycle includes M × N tracks, where N is an integer.

9. A disk-shaped recording medium according to claim 7, wherein the first cycle includes N first access codes, where N is an integer, the second cycle includes M second access codes, where M is an integer, and M and N have no common divisor except for 1.

10. A disk-shaped recording medium according to claim 7, wherein the number of the first servo areas is larger by one than the number of the second servo areas and one of the first servo areas is an additional first area which does not correspond to any of the second servo areas, the additional first servo area includes an index code instead of the first access code, the index code having a pattern which is different from any pattern of the first and the second access codes.

* * * * *